United States Patent
Shigehiro et al.

(10) Patent No.: US 6,741,387 B2
(45) Date of Patent: May 25, 2004

(54) DISPLAY ELEMENT

(75) Inventors: Kiyoshi Shigehiro, Ashigarakami-gun (JP); Kiyokazu Mashimo, Minamiashigara (JP); Kenji Yao, Minamiashigara (JP); Hiroshi Miyamoto, Minamiashigara (JP); Kyoko Nishikawa, Minamiashigara (JP); Yasufumi Suwabe, Ashigarakami-gun (JP); Yoshinori Machida, Ashigarakami-gun (JP); Takeshi Matsunaga, Ashigarakami-gun (JP); Yoshiro Yamaguchi, Ashigarakami-gun (JP); Motohiko Sakamaki, Ashigarakami-gun (JP); Katsumi Nukada, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 74 days.

(21) Appl. No.: 10/223,608

(22) Filed: Aug. 20, 2002

(65) Prior Publication Data

US 2003/0099027 A1 May 29, 2003

(30) Foreign Application Priority Data

Sep. 28, 2001 (JP) .......................... 2001-304102
Jun. 21, 2002 (JP) .......................... 2002-181177

(51) Int. Cl.[7] .......................... G02B 26/00; G09G 3/00; G09G 3/20; G09G 3/34
(52) U.S. Cl. .......................... 359/296; 345/31; 345/55; 345/107
(58) Field of Search .......................... 359/296; 345/30, 345/31, 55, 84, 107, 112; 348/383; 250/378; 252/572

(56) References Cited

U.S. PATENT DOCUMENTS 6,113,810 A * 9/2000 Hou et al. ................... 252/572
6,529,313 B1 * 3/2003 Lin et al. ................... 359/296
6,587,254 B2 * 7/2003 Matsunaga et al. ......... 359/296
6,636,186 B1 * 10/2003 Yamaguchi et al. .......... 345/31

FOREIGN PATENT DOCUMENTS

| JP | A 10-3177 | 1/1998 |
| JP | A 10-10775 | 1/1998 |
| JP | A 2000-165138 | 6/2000 |
| JP | A 2000-292971 | 10/2000 |
| JP | A 2001-33833 | 2/2001 |

OTHER PUBLICATIONS

US 2002/0060293 A1, Yamamoto et al, May 23, 2002, 250/378.*

JO, Gugrae; Sugawara, Katsuhiko; Hoshino, Katsuyoshi and Kitamura, Takashi, "New Toner Display Device (J)," Japan Hardcopy, '99 Article Collection, pp. 249–252.

JO, Gugrae; Hoshino, Katsuyoshi and Kitamura, Takashi, "New Toner Display Device (II)," Japan Hardcopy, Fall Preliminary Report Collection, pp. 10–13.

* cited by examiner

Primary Examiner—Loha Ben
(74) Attorney, Agent, or Firm—Oliff & Berridge, PLC

(57) ABSTRACT

The present invention provides a display element, which is driven at a low voltage, displays a high-contrast image with few density irregularities, and has improved image holding property. In a display element, which displays an image by moving, between a first and second substrate, particles having different colors and charge polarities by an electric field applied between the first and second substrates, the surface roughness of at least one of the substrates is 1 nm to 1 μm, the coefficient of shape is 100 to 140, the width and depth of the recessed part are not identical to the diameter of the particles and the contacting parts of the recessed part and the particles do not form a surface.

32 Claims, 17 Drawing Sheets

ELECTRIC FIELD ON
(WHITE DISPLAY)

ELECTRIC FIELD ON
(BLACK DISPLAY)

ELECTRIC FIELD OFF
(WHITE DISPLAY)

ELECTRIC FIELD OFF
(BLACK DISPLAY)

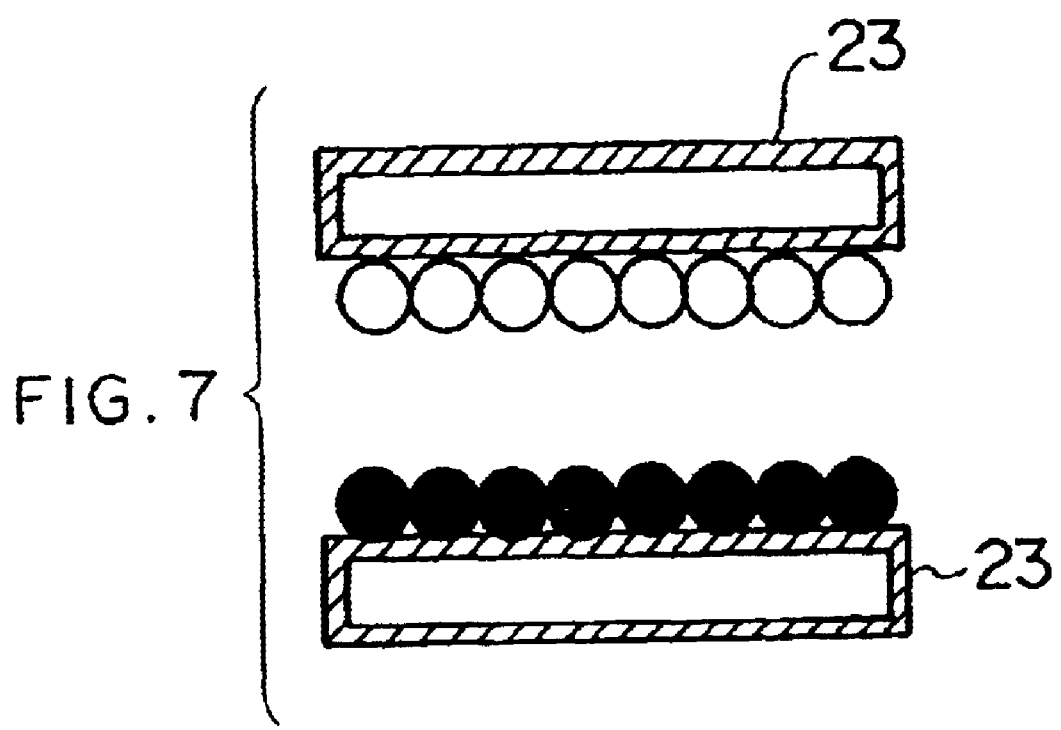

DISPLAY ELEMENT

BACKGROUND OF THE INVENTION

1. Field of the Invention

The present invention relates to a display element. More specifically, it relates to a display element for repeatedly displaying an image by driving colored particles with an electric field.

2. Description of the Related Art

Examples of display element having excellent holding property and capable of being rewritten repeatedly include twisting ball displays (two-color painted particle rotating display), electrophoresis display mediums, magnetophoresis display mediums, thermal rewritable display mediums, liquid crystals having a memory property, or the like. However, since these elements cannot display a white color like paper, they have a problem of low image contrast.

In order to solve the low contrast problem, display techniques using toners have been proposed (Japan Hardcopy, '99 Article Collection, pp. 249–252, and Japan Hardcopy, Fall Preliminary Report Collection, pp. 10–13). According to the display technique, a conductive colored toner and a white particle are sealed in a space between a display substrate and a non-display substrate, which face each other. The display substrate and the non-display substrate each comprise an electrode. A charge is injected to the conductive colored toner via a charge conveying layer provided in the electrode of the non-display substrate. The conductive colored toner into which the charge was injected is moved to a side of the display substrate disposed facing the non-display substrate by the electric field therebetween. By adhesion of the conductive colored toner to the display substrate, the color of the conductive colored toner is displayed on the display substrate. Accordingly, a high contrast image is displayed with the color of the conductive colored toner and the white of the white particle.

According to the display technique, since the solid colored toners and white particle are used, unlike the case of using a liquid instead of either one of the toner and the particle, deterioration of the display density due to intrusion of the liquid into the toner or the particle does not occur. Therefore, theoretically the display can be switched completely between the white and the toner color (for example, black). However, according to this display technique, a charge is not injected to a toner, which does not contact the charge conveying layer provided in the electrode of the non-display substrate and is isolated from the other conductive colored toners. The toner without the charge injection exists in a space between the substrates randomly without being moved by the electric field so that the toner and the white particles exist in a mixed manner, and thus a problem of the image display with a low contrast is involved in practice.

A method for forming an image by moving or rotating a particle that was charged by the effect of the electric field, is proposed in the official gazette of the Japanese Patent Application Laid-Open (JP-A) No. 2001-33833. According to the method, substrates provided with a conductive layer or a rectifying layer are disposed facing each other, and two kinds of colored particles having colors different from each other and without a charge of the same polarity are sealed between the substrates. By transferring a charge to each particle from the conductive layer or the rectifying layer and moving or rotating the particles by the effect of the electric field, the image is displayed. However, the method has a problem of image density irregularities and contrast deterioration being generated due to local charge leakage.

An image display medium comprising a pair of substrates and a group of different kinds of particles having different colors and charge characteristics, sealed between the substrates, movably between the substrates by an applied electric field is proposed in the official gazette of the Japanese Patent Application No. 2000-165138. According to this image display medium, high whiteness degree and contrast can be obtained. However, the driving voltage is increased, because the image display medium requires an applied voltage of several hundred volts for displaying an image, therefore, this image display medium has a problem that the degree of freedom in designing the driving circuit is lowered.

Moreover, with repetition of contact electrification of the particles and the substrate, and frictional electrification among the particles, the amount of the charge of the particles becomes too large relative to an initial charge amount, and the particles coagulate or adhere to the substrate. As a result, there are also problems of the contrast being reduced, the unevenness in image density, and the driving voltage increasing.

SUMMARY OF THE INVENTION

Accordingly, in order to solve the above-mentioned problems, the present invention has been achieved, and an object thereof is to provide a display element capable of displaying an image with a high contrast and few density irregularities, which is driven at a low voltage, and has an improved image holding property.

In order to solve the above-mentioned problems, a first aspect of the present invention provides a display element comprising a first substrate and a second substrate, which are disposed facing each other, and multiple kinds of particles having different colors and charge polarities, which particles are sealed in a space between the first substrate and the second substrate and can be moved between the first substrate and the second substrate by an electric field applied thereto, wherein the surface coarseness of at least one of the first substrate and the second substrate, on the surface thereof that faces the other substrate, is more than 1 nm and no greater than 10 $\mu$m, and the coefficient of a shape of the particles is more than 100 and no greater than 140 when FE represents the coefficient of shape of the particles, L represents the circumference of the particles, S represents the area of the particles and FE=$((L^2/S)/4\pi) \times 100$.

According to the first aspect of the present invention, when the surface coarseness of at least the first substrate and the second substrate on the surface of the side facing the other substrate is more than 1 nm and 10 $\mu$m or less, and the coefficient of shape of the particles is more than 100 and 140 or less (wherein FE is the coefficient of shape of the particles, L is the circumference of the particles, S is the area of the particles and FE=$((L^2/S)/4\pi) \times 100$), the distance between the substrates and the particles becomes longer and the contact area of the substrates and the particles becomes smaller, and thus the particles adhered to the substrate can be separated easily. Thus, the driving voltage of the display element can be reduced. In this case, the coefficient of shape FE represents the roundness of the particles are projected onto a plane, and the circumference L and the area S each represent a value measured by projecting the particles onto a plane.

A second aspect of the present invention provides a display element comprising a first substrate and a second substrate disposed facing each other, and multiple kinds of substantially spherical particles having different colors and charge polarities, which particles are sealed in a space between the first substrate and the second substrate, and can be moved between the first substrate and the second substrate by an electric field, applied thereto, wherein the surface coarseness (Rz) of at least one of the first substrate and the second substrate is smaller than the average diameters of the multiple kinds of particles.

According to the second aspect of the present invention, since the surface coarseness (Rz) of at least one of the first substrate and the second substrate is smaller than the average diameters of the multiple kinds of particles, the particles cannot be fitted into the concave surface of the substrate and the particles adhered to the substrate can be separated easily. Accordingly, the driving voltage of the display element can be reduced.

A third aspect of the present invention provides a display element comprising a first substrate and a second substrate disposed facing each other, and multiple kinds of particles having different colors and charge polarities, which particles are sealed in a space between the first substrate and the second substrate and can be moved between the first substrate and the second substrate by an electric field applied thereto, wherein the water contact angle of at least one of the first substrate and the second substrate, on the surface thereof that faces the other substrate, is at least 70°.

According to the third aspect of the present invention, since the contact angle with respect to water of at least one of the first substrate and the second substrate on the surface of the side facing the other substrate is 70° or more, the water repellent property can be improved so that the particles adhered on the substrate can be separated easily. Thus, the driving voltage of the display element can be reduced.

A fourth aspect of the present invention provides a display element comprising a first substrate and a second substrate disposed facing each other, and multiple kinds of particles having different colors and charge polarities, which particles are sealed in a space between the first substrate and the second substrate and can be moved between the first substrate and the second substrate by an electric field applied thereto, wherein the coefficient of dynamic friction of at least one of the first substrate and the second substrate, on the surface thereof that side faces the other substrate is no more than 0.7.

According to the fourth aspect of the present invention, since the coefficient of dynamic friction of at least one of the first substrate and the second substrate on the surface of the side facing the other substrate is 0.7 or less, the resistance between the substrate and the particles by the coefficient of dynamic friction can be reduced, and thus the particles adhered to the substrate can be separated easily. Thus, the driving voltage of the display element can be reduced.

A fifth aspect of the present invention provides a display element comprising a first substrate and a second substrate disposed facing each other, and multiple kinds of particles having different colors and charge polarities, which particles are sealed in a space between the first substrate and the second substrate and can be moved between the first substrate and the second substrate by an electric field applied thereto, wherein the surface resistance of at least one of the first substrate and the second substrate, on the surface thereof that faces the other substrate, is at least $1.0 \times 10^7$ $\Omega/cm^2$.

According to the fifth aspect of the present invention, since the surface resistance of at least one of the first substrate and the second substrate, on the surface of the side facing the other substrate is $1.0 \times 10^7$ $\Omega/cm^2$ or more, movement of the charge from the particles to the substrate is suppressed so that the charge of the particles can be maintained over a long time, thereby improving the image holding property. Thus an image with a high contrast can be displayed without image irregularities.

A sixth aspect of the present invention provides a display element comprising: a first substrate and a second substrate disposed facing each other, and multiple kinds of particles having different colors and charge polarities, which particles are sealed in a space between the first substrate and the second substrate and can be moved between the first substrate and the second substrate by an electric field applied thereto, wherein a gas barrier layer is provided on at least one of the first substrate and the second substrate.

According to the sixth aspect of the present invention, since a gas barrier layer is provided on at least one of the first substrate and the second substrate, the particles are shielded from the atmosphere so that the charge characteristics of the particles can be stable, and thus the image holding property can be improved and an image with a high contrast can be displayed without image irregularities.

A display element of the seventh embodiment comprises: a first substrate and a second substrate disposed facing each other; and multiple kinds of particles having different colors and charge polarities, which particles are sealed in a space between the first substrate and the second substrate and can be moved between the first substrate and the second substrate by an electric field applied thereto, wherein a surface layer, which has a volume resistivity value as expressed by a common logarithmic value (log$\Omega$·cm) of 7 to 16, is disposed on a surface of at least one of the first substrate and the second substrate, which surface faces the other substrate.

According to the seventh aspect of the present invention, by at least one of the first substrate and second substrate having the surface layer on the surface thereof that faces the other substrate, and the volume resistivity of the surface layer, expressed by a common logarithmic value (log$\Omega$·cm), being from 7 to 16, an electrification characteristic is stabilized over a long period of time and coagulation of the particles is suppressed. Thus, a high contrast image having no image unevenness can be displayed with low driving voltage and stable repetition.

BRIEF DESCRIPTION OF THE DRAWINGS

FIG. 7 is a diagram showing a substrate having a gas barrier layer according to a sixth embodiment.

DESCRIPTION OF THE PREFERRED EMBODIMENTS

First Embodiment

Figure 1:
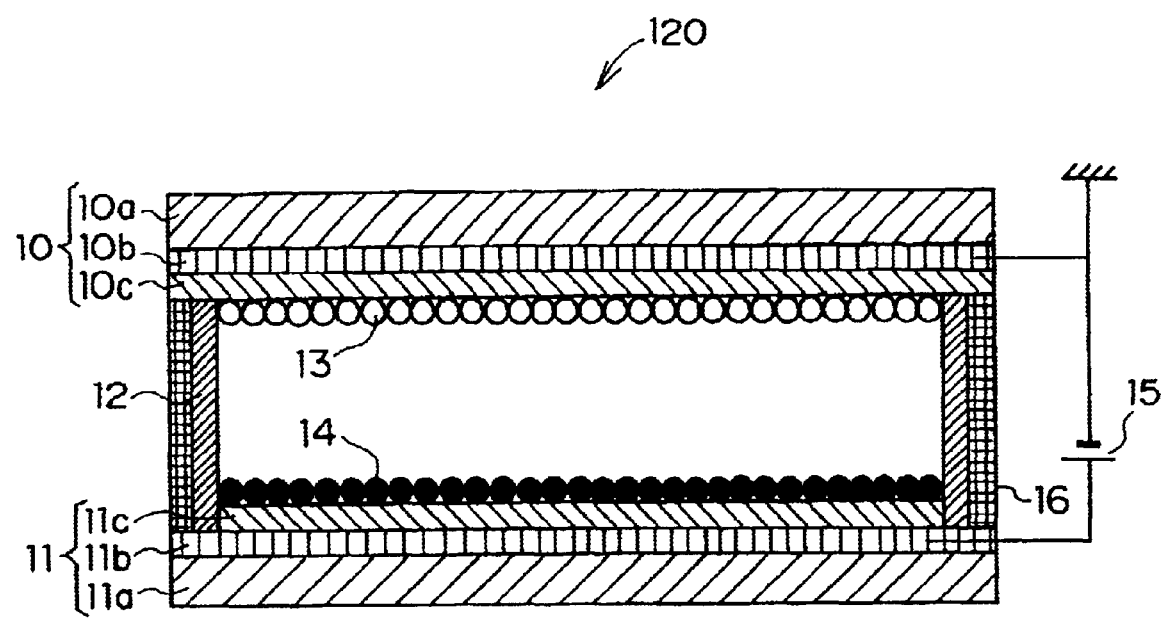
FIG. 1 is a cross-sectional view of a display element.

Hereinafter, embodiments of the present invention will be explained in detail with reference to the drawings. FIG. 1 shows the cross-sectional configuration of a display element 120 for showing a single pixel of the present invention.

As shown in FIG. 1, the display element 120 comprises a display substrate 10 as a first substrate and a rear substrate 11 as a second substrate disposed facing each other via a spacer 12. Multiple kinds of particles having different colors and charge polarities are sealed in a space between the display substrate 10 and the rear substrate 11. Here, for example, two kinds of particles, specifically first particles 13 (for example, white) and second particles 14, having a color different from that of the first particles (for example, black), are sealed. A sealing part 16 for sealing the display element is formed on the outer circumference of the spacer 12.

The display substrate 10 is formed by laminating a transparent substrate 10a, a transparent electrode 10b and a dielectric film 10c. The transparent electrode 10b is connected with a voltage applying component 15. The rear substrate 11 is formed by laminating a substrate 11a, an electrode 11b and a dielectric film 11c. The electrode 11b is grounded.

The display substrate 10 can be formed by, for example, etching a transparent glass electrode (2 mm) which was formed by sputtering an ITO electrode, in an optional conductive pattern, dip coating the transparent glass electrode in a solution, which was obtained by dissolving 5 parts by weight of a polycarbonate resin in 45 parts by weight of a monochloro benzene, on the conductive surface and drying so as to form a polycarbonate film (5 μm).

The rear substrate 11 can be formed by, after forming the spacer 12 at the electrode 11b, for example, dip coating a solution obtained by dissolving 5 parts by weight of a polycarbonate resin in 45 parts by weight of a monochloro benzene onto the electrode surface of an epoxy electrode substrate, which comprises a copper electrode attached to an epoxy substrate (5 mm), and drying so as to form a polycarbonate film (5 μm).

The spacer 12 can be formed by, for example, screen printing. The screen printing is a method of printing by superimposing inks by a number of times using a block with an optional pattern formed thereon. Thus, a spacer having an optional height (that is, the length in the direction orthogonal to the substrate surface) can be produced highly accurately. As ink used for the screen printing, for example, a thermosetting resin can be used. Specifically, a process of pattern printing on the rear substrate 11 and heating at 110° C. in an oven is repeated the spacer 12 obtains a desired height.

The first particles 13 can be obtained by, for example, adding 0.4 part by weight of a titania fine powder with an isopropyl trimethoxy silane process applied to 100 parts by weight of a spherical fine particle of a cross-linked polymethyl methacrylate containing a titanium oxide having a 20 μm volume average particle size (Techpolymer MBX-20-white produced by Sekisui Plastics Co., Ltd. classified).

The titania fine powder with the silane process applied has a function of restraining the charge property of the particles to an appropriate level for maintaining a high level of particle flowability. The amount of the titania fine particles applied with the silane process can be adjusted optionally according to the first particle size and the fine powder size. If this amount is too large, fine powders may separate from the surface of the first particles and adhered to the surface of the second particle. The charge polarity of the second particles would become the same as the charge polarity of the first particles and the second particles would be moved in the same direction as the first particles. Thus it is not preferable. The titania amount with respect to 100 parts by weight of the particles is preferably 0.05 to 1.0 part by weight, and more preferably 0.1 to 0.5 part by weight, An example of the second particles 14 is a spherical fine particle of a polymethyl methacrylate, which contains a carbon, having a 20 μm volume average particle size (Techpolymer MBX-20-black produced by Sekisui Plastics Co., Ltd. classified).

The first particles 13 and the second particles 14 are mixed by a predetermined weight ratio, for example, by 2 to 1, and are shifted into an opening of the spacer 12, which is disposed on the rear substrate 11 through a screen. The first particles 13 and the second particles 14 which adhere to the upper part of the spacer 12 are removed by a silicone rubber blade.

The sealing part 16 can be produced by: superimposing the dielectric film 10c side of the display substrate 10 and the dielectric film 11c side of the rear substrate 11 having the spacer 12 formed thereon; fixing the surfaces with a clamp or a clip, and injecting a resin into a gap between the display substrate 10 and the rear substrate 11 using a dispenser; and hardening the resin.

FIGS. 2A to 2D show a display state of the display element 120. The first particles 13 and the second particles 14 are charged with a polarities different from each other by, for example, the friction charge by the mutual friction. Here, the first particles 13 are negative-charged and the second particles 14 are charge positively. For example, if the dielectric film in an inner side of the substrate is made of a polycarbonate resin (PC-Z) the average charge amount of the first particles 13 is −16fC, and the average charge amount of the second particles 14 is +16fC. Since the material of the surface of the substrate inner side has a significant influence on the charge polarities of the particles, it should be selected optionally.

Figure 2A:
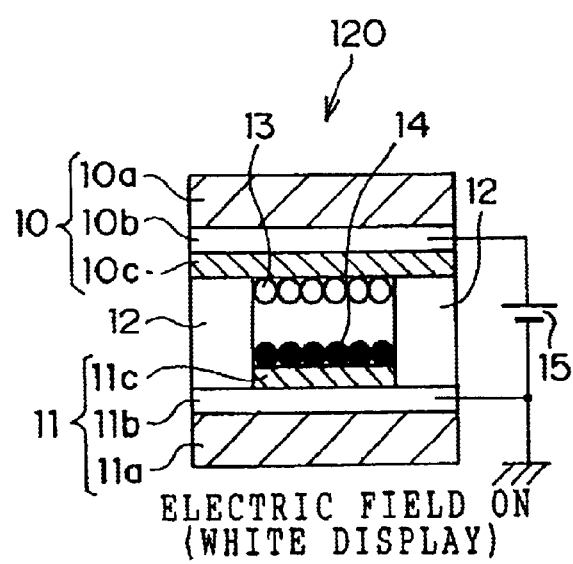
FIGS. 2A to 2D are cross-sectional views of the display element in driven states.

FIG. 2A shows a case of applying a direct current voltage (for example, DC200V) to apply a positive potential to the transparent electrode 10b of the display substrate 10. Since the first particles 13 are negative-charged, they are moved to the display substrate 10, and since the second particles 14 are positive-charged, they are moved to the rear substrate 11.

Figure 2B:
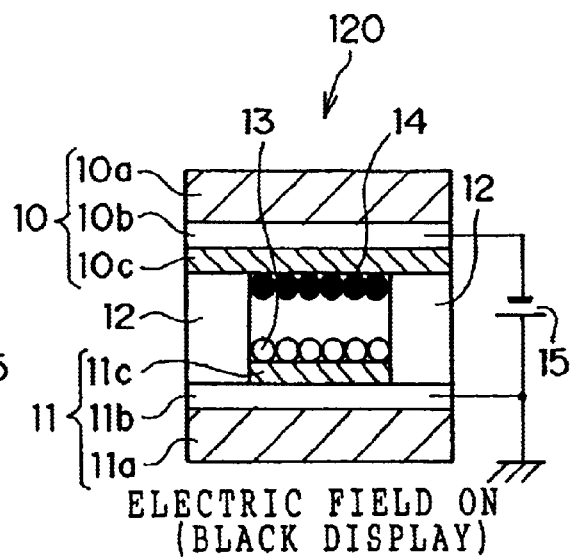
Figure 2C:
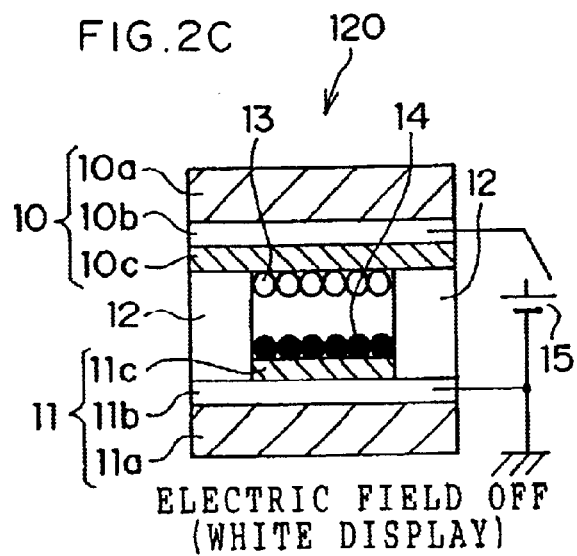

FIG. 2C shows the case of cutting off the voltage application to the transparent electrode 10b from the FIG. 2A state. Even when the voltage application is cut off, since the electric field is maintained by the dielectric films 10c and 11c, the first particles 13 are held on the display substrate 10 and the second particles 14 are held on the rear substrate 11.

FIG. 2B shows the case of applying a direct current voltage (for example, DC200V) for applying a negative potential to the transparent electrode 10b. Since the first particles 13 are negative-charged, they are moved to the rear substrate 11 side, and since the second particles 14 are positive-charged, they are moved to the display substrate 10.

Figure 2D:
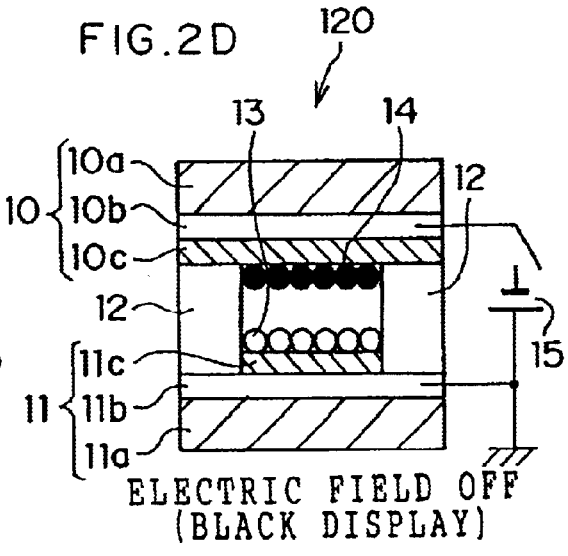

FIG. 2D shows the case of cutting off the voltage application to the transparent electrode 10b from the FIG. 2B state. Even when the voltage application is cut off, since the electric field is maintained by the dielectric films 10c and 11c, the first particles 13 are held on the rear substrate 11 and the second particles 14 are held on the display substrate 10.

As shown in FIGS. 2A and 2C, when a voltage is applied by the voltage applying component 15, an electric lines of force is formed between the display substrate 10 and the rear substrate 11 so that the first particles 13 and the second particles 14 are moved along the electric line of force. According to the applied voltage, either of the first particles 13 or the second particles 14 is adhered on the display substrate 10 so that a desired particle color is displayed on the display substrate 10.

The display element has modified embodiments as shown below.

First Modified Embodiment of the Display Element

Figure 9:
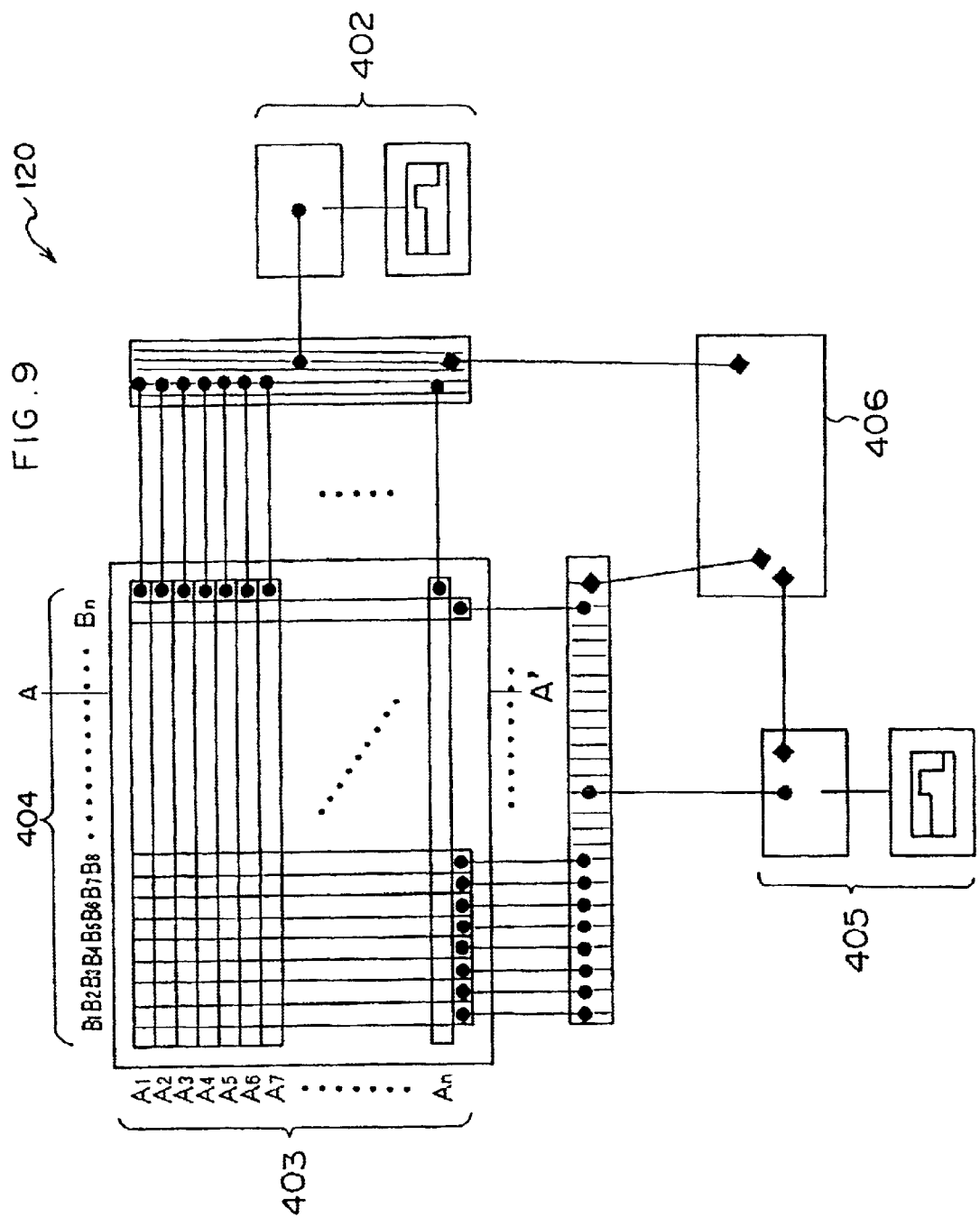
FIG. 9 is a diagram showing a second modified embodiment of the display element.

A first modified embodiment of the display element is a simple matrix type display element 120 capable of displaying a plurality of pixels and is shown in FIG. 9.

In the simple matrix type display element 120, stripe-shaped electrodes 403 of the display substrate and stripe-shaped electrodes 404 of the rear substrate are disposed so as to intersect. According to the lattice provided by the electrodes 403 and 404, lattice-like spaces corresponding to the pixel can be formed by the spacer so that particles having different charge properties are sealed in each space. Electric field generating devices 402 and 405 and a sequencer 406 are connected with the display element 120.

The voltage applied to the electrodes 403 and 404 by the electric field generating devices 402 and 405 is controlled by the sequencer 406. According to the control by the sequencer 406, for example, an electric field for driving the particles per line unit is applied to the electrode 403, and an electric field according to image information is applied to the electrode 404 with the timing matched. By driving the particles sealed in the spaces at the positions where the electrodes 403 and 404 intersect the applied electric field and moving these particles to the display substrate and the rear substrate according to the charge polarity of the particles, an image having a plurality of pixels can be displayed on the display element 120.

Figure 10:
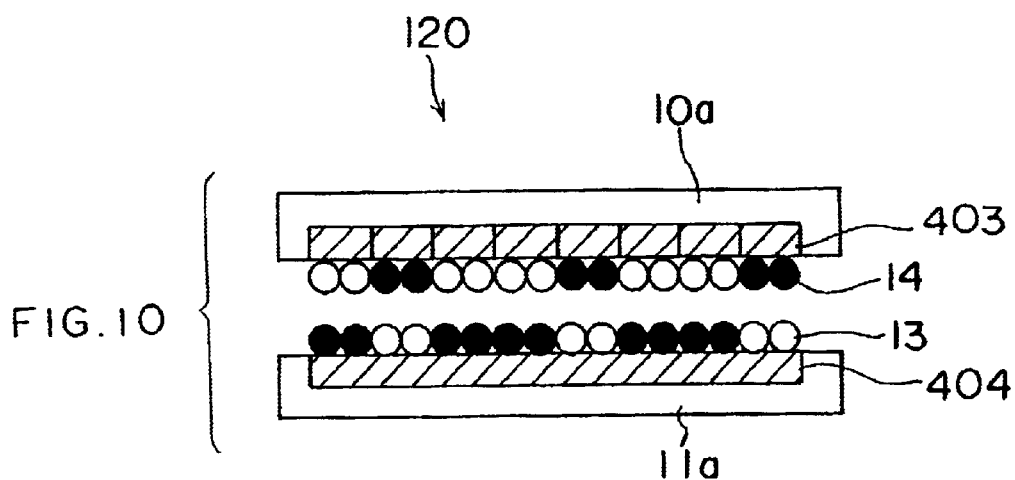
FIG. 10 is a cross-sectional view of the second modified embodiment of the display element.
Figure 11:
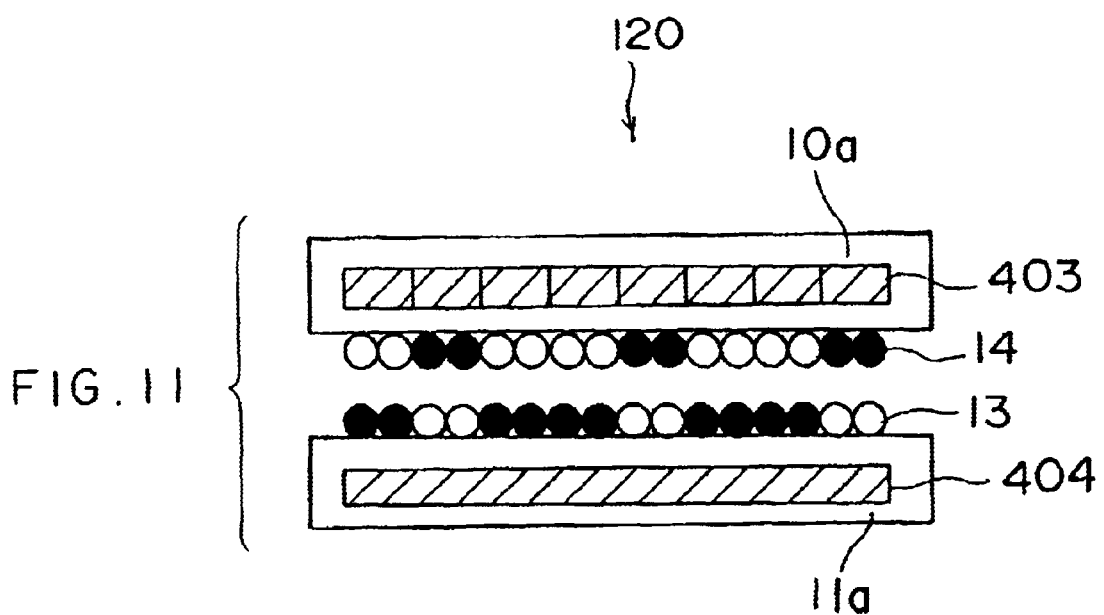
FIG. 11 is a cross-sectional view of the second modified embodiment of the display element.
Figure 12:
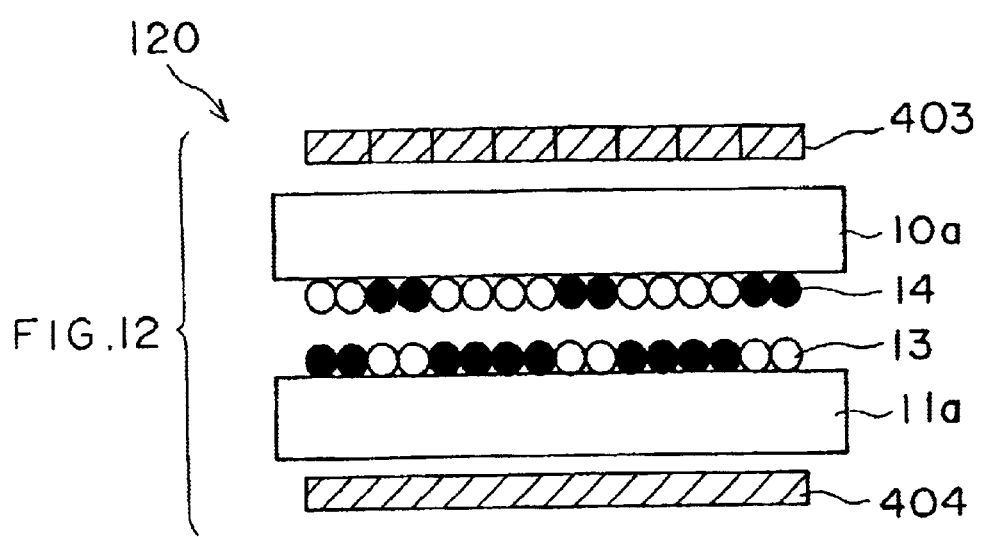
FIG. 12 is a cross-sectional view of the second modified embodiment of the display element.

FIGS. 10 to 12 are cross-sectional views taken on the line AA' of the display element 120 of FIG. 9. The electrodes 403 and 404 may be integrally embedded in the substrate 10a or 11a as shown in FIGS. 10 and 11, or may be separated from the substrate as shown in FIG. 12. As shown in FIG. 12, the electrodes 403 and 404 may be disposed on the side of the substrate 10a or 11a opposite to the sides facing each other, that is, on the outer side.

Second Modified Embodiment of the Display Element

Figure 13:
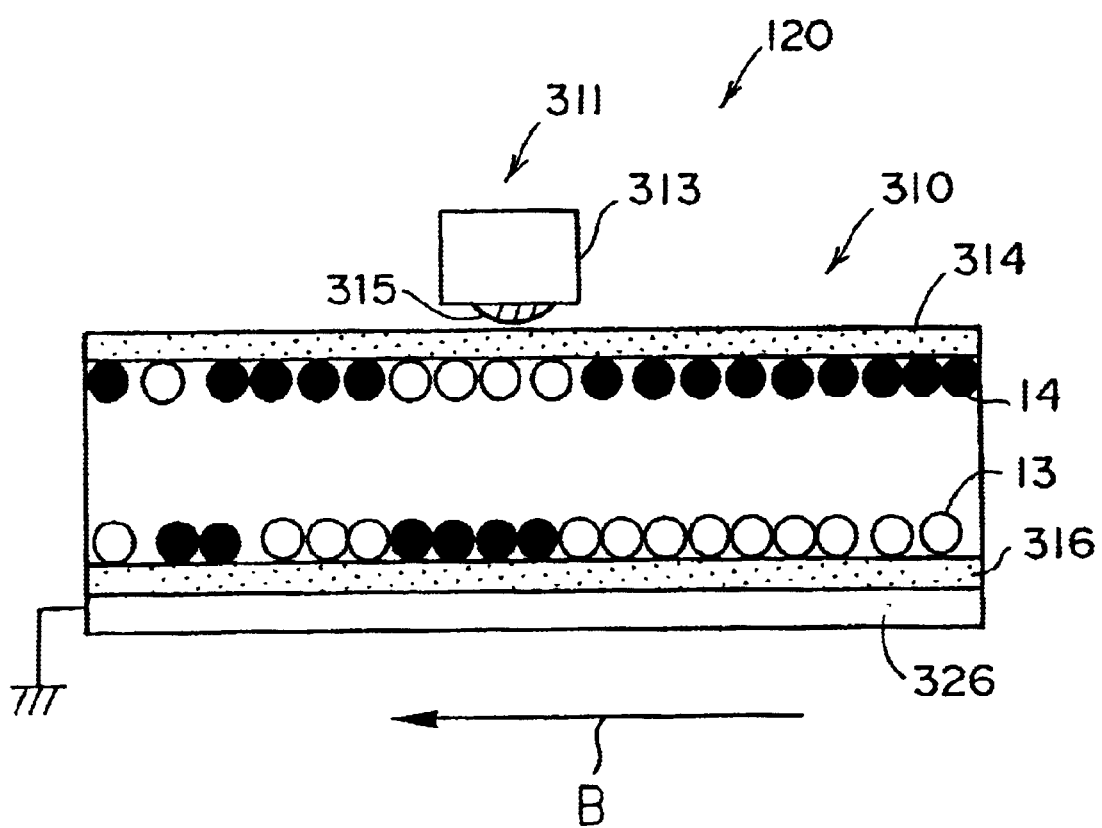
FIG. 13 is a diagram showing a third modified embodiment of the display element.

A second modified embodiment of the display element 120 is shown in FIG. 13. The display element 120 of FIG. 13 utilizes a printing electrode 311.

Figure 14:
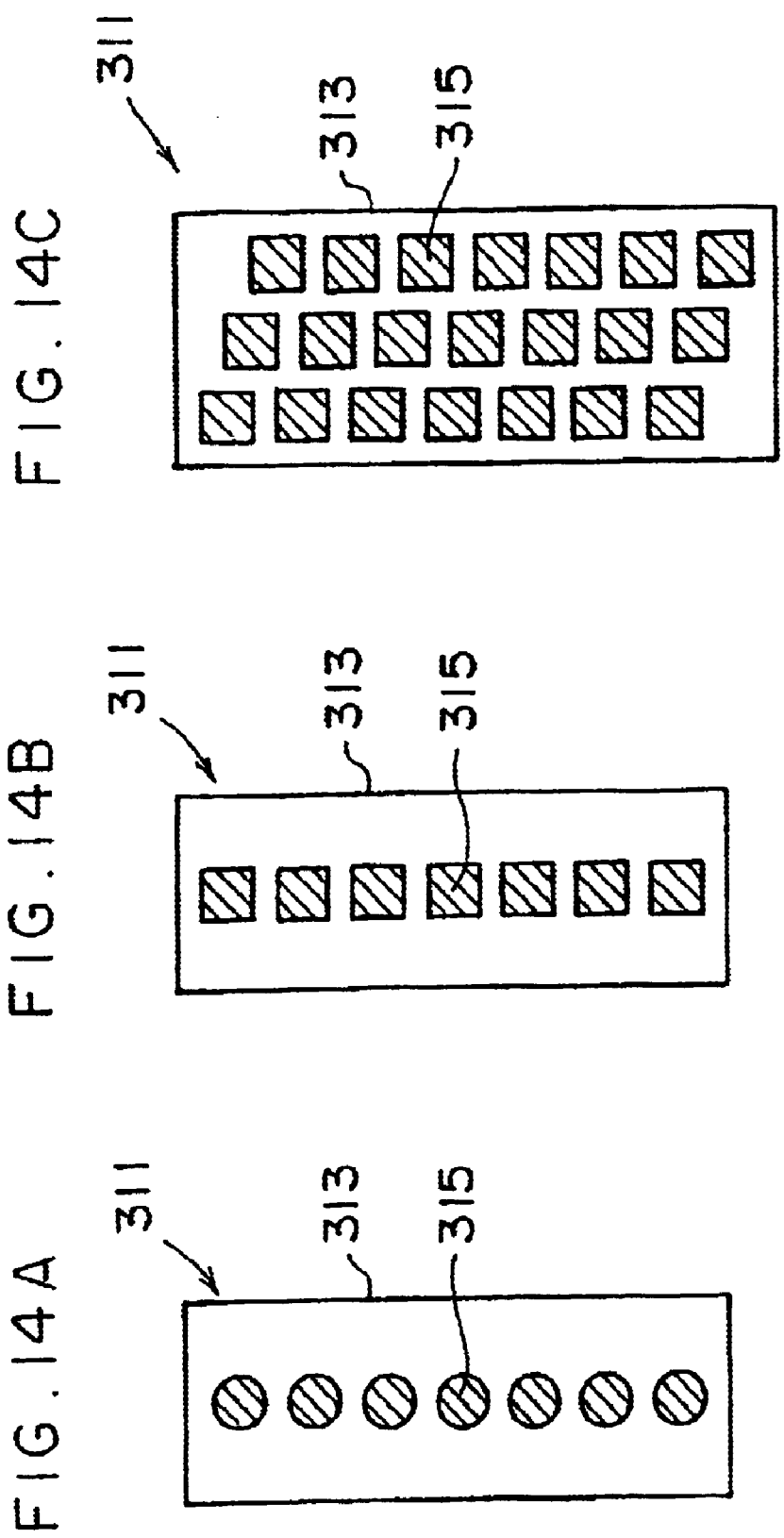
FIGS. 14A to 14C are diagrams showing a printing electrode of the third embodiment of the display element.

As shown in FIGS. 13 and 14A, the display element 120 comprises the printing electrode 311, a counter electrode 326, an un-illustrated power source, or the like. The printing electrode 311 comprises a substrate 313 and electrodes 315 (for example, a 100 μm diameter).

As shown in FIG. 14A, the electrodes 315 are arranged in a row by a predetermined interval according to the image resolution along the direction substantially orthogonal to the conveyance direction (arrow B direction in the figure) of a display medium 310 on one side surface of the substrate 313 (that is, in the main scanning direction). The display medium 310 is a medium with two or more kinds of particle groups sealed in a space between a pair of substrates not having an electrode.

Figure 15:
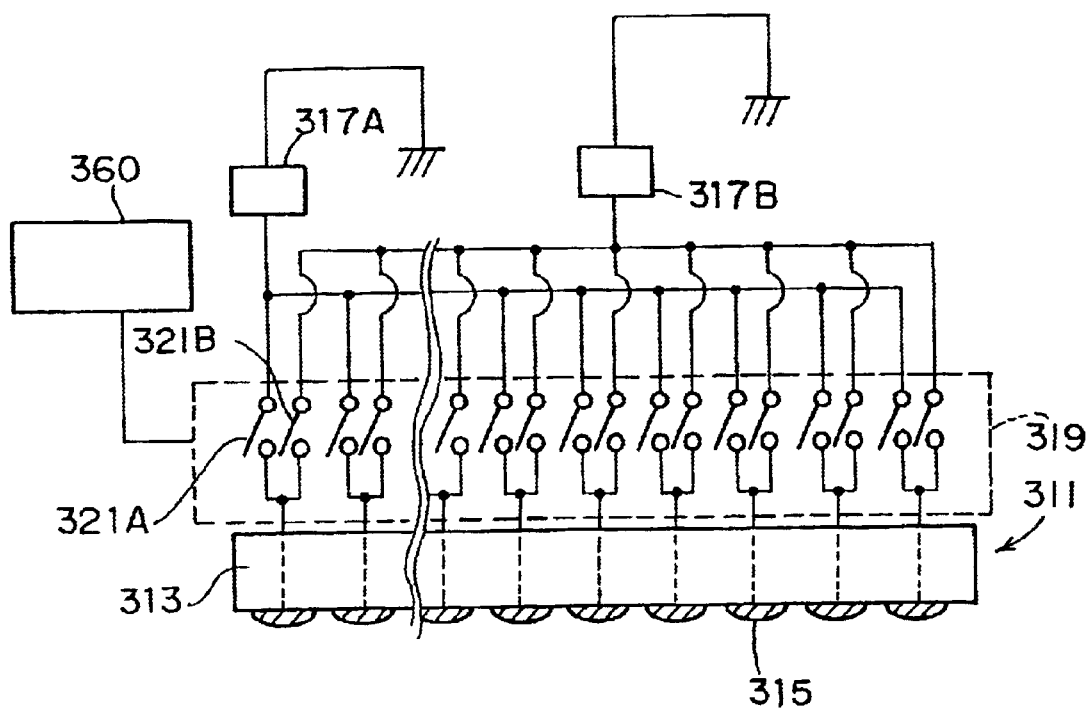
FIG. 15 is a diagram showing a circuit of the third modified embodiment of the display element.

As shown in FIG. 15, each electrode 315 is connected with an AC power source 317A and a DC power source 317B via a connection control part 319. The connection control part 319 comprises switches including a switch 321A with one end connected to the electrodes 315 and the other end connected to the AC power source 317A, and a switch 321B with one end connected to the electrodes 315 and the other end connected to the DC power source.

These switches are on-off controlled by a control part 360 for electrically connecting the AC power source 317A and the DC power source 317B with the electrodes 315. Thus, a voltage with the alternative current voltage or the direct current voltage, or the alternative current voltage and the direct current voltage superimposed can be applied.

When the image display medium 310 is conveyed in the arrow B direction in the figure by an un-illustrated conveyance component so as to be disposed between the printing electrode 311 and the counter electrode 326, the control part 360 provides a command to the connection control part 319 for turning on all of the switches 321A. Thus, an alternative current voltage is applied to all the electrodes 315 from the AC power source 317A.

When the alternative current is applied to the electrodes 315, the black particles 14 and the white particles 13 in the display medium 310 have reciprocal motion between the display substrate 314 and the rear substrate 316. Thus, the black particles 14 and the white particles 13 are friction-charged by the friction among the particles and the friction between the particles and the substrates, for example, the black particles 14 are positive-charged and the white particles 13 are not charged or are negative-charged. In the description below, explanation will be given for a case in which the white particles 13 are negative-charged.

The control part 360 provides a command to the connection control part 319 for turning on only the switches 321B corresponding to the electrodes 315 at a position according to the image data so as to apply a direct current voltage to the electrodes 315 at a position corresponding to the image data. For example, the direct current voltage is applied to the non-image portion and the direct current voltage is not applied to the image portion.

Thus, when the direct current voltage is applied to the electrodes 315, the positive-charged black particles 14 which were at a part of the printing electrode 311 facing the display substrate 314 are moved to the rear substrate 316 side by the function of the electric field. Moreover, the negative-charged white particles 13, which were at the rear substrate 316 side, are moved to the display substrate 314 side by the function of the electric field. Therefore, since only the white particles 13 appear at the display substrate 314 side, the image is not displayed at a part corresponding to the non-image portion.

In contrast, when the direct current voltage is not applied to the electrodes 315, the positive-charged black particles 14, which were at a part of the printing electrode 311 facing the display substrate 314 are maintained on the display substrate 314 side by the function of the electric field. Moreover, the positive-charged black particles 14, which were at the rear substrate 316 side, are moved to the display substrate 314 side by the function of the electric field. Therefore, since only the black particles 14 appear at the display substrate 314 side, the image is displayed at a part corresponding to the image portion.

Thereby, since only the black particles 14 appear on the display substrate 314 side, the image is displayed at a part corresponding to the image portion.

Accordingly, the black particles 14 and the white particles 13 are moved according to the image so that the image is displayed on the display substrate 314 side. When the white particles 13 are not charged, only the black particles 14 are moved according to the influence of the electric field. Since the black particles 14 at a position, which does not display the image, are moved to the rear substrate 316 side and they are blocked by the white particles 13 from the display substrate 314 side, the image can be displayed. Moreover, even after the electric field generated between the substrates of the display medium 310 disappear, the displayed image can be maintained by the adhesive force inherent to the particles. Moreover, since the particles can be moved again when an electric field is generated between the substrates, images can be displayed repeatedly by the display element 120.

Accordingly, since the charged particles are moved by the electric field with the air as the medium, it is highly safe. Moreover, since the air has a low viscous resistance, the high speed responsiveness can be satisfied.

The electrodes 315 may be square as shown in FIG. 14B, or they can be arranged in a matrix as shown in FIG. 14C.

Third Modified Embodiment of the Display Element

A third modified embodiment of the display element will be explained with reference to FIG. 16. The third modified embodiment of the display element is an image forming device using an electrostatic latent supporting member.

The display element 120 comprises an electrostatic latent image forming part 422, a drum-shaped electrostatic latent image supporting member 424, a counter electrode 426, a direct current voltage power source 428, or the like.

The electrostatic latent image forming part 422 comprises a charging device 480 and a light beam scanning device 482. As the electrostatic latent image supporting member 424, for example, a photosensitive drum can be used. The photosensitive drum 424 is provided by forming a photoconductive layer on a drum-shaped conductive base member made of an aluminum, an SUS, or the like. As the photoconductive layer, for example, an inorganic photoconductive material such as an α-Si, an α-Se and an $As_2Se_3$, an organic photoconductive material such as PVK/TNF, or the like, can be used. These can be formed by a plasma CVD, a deposition method, a dipping method, or the like. Moreover, a charge conveying layer, an overcoat layer, or the like can be formed as needed.

The charge device 480 charges the surface of the electrostatic latent image supporting member 424 uniformly at a desired potential. As the charge device 480, any device capable of charging the surface of the photosensitive drum 424 at an optional potential can be used. For example, a corotron for charging the surface of the photosensitive drum 424 uniformly by applying a high voltage to an electrode wire and generating a corona discharge with respect to the electrostatic latent image supporting member 424, can be used. In addition thereto, various kinds of chargers, such as one having the photosensitive drum surface charged by contacting the photosensitive drum 424 with a conductive roll member, brush, film member, or the like and applying a voltage thereto, can be used.

The light beam scanning device 482 forms an electrostatic latent image on the electrostatic latent image supporting member 424 by irradiating the surface of the charged electrostatic latent image supporting member 424 with a minute spot light based on the image signal. As the light beam scanning device 482, any device capable of irradiating the surface of the photosensitive drum 424 with the light beam according to the image information for forming an electrostatic latent image on the photosensitive drum 424 uniformly charged, can be used. For example, an ROS (raster output scanner) device for optically scanning the surface of the photosensitive drum 424 by the polygon mirror 484 while on-off controlling the laser beam, which is adjusted to a predetermined spot size according to the image signal by an image forming optical system comprising a polygon mirror 484, a returning mirror 486, an un-illustrated light source, lens, or the like, can be used. In addition thereto, an LED head with LEDs arranged according to a desired resolution, or the like can be used.

A conductive supporting member 424A of the electrostatic latent image supporting member 424 is grounded, and the electrostatic latent image supporting member 424 is rotated in an arrow A direction in the figure.

The counter electrode 426 comprises, for example, an elastic conductive roll member. Thereby, it can be contacted closely with the image display medium 410. Moreover, the counter electrode 426 is disposed at a position facing the electrostatic latent image supporting member 424 with respect to the image display medium 410 to be conveyed by an un-illustrated conveyance component in an arrow B direction in the figure. The counter electrode 426 is connected with a direct current voltage power source 428 so that a bias voltage $V_B$ can be applied. The bias voltage $V_B$ is provided as a potential midway the potential $V_H$ of a part of the positive-charged electrostatic latent image supporting member 424 and the potential $V_L$ of an uncharged part, as shown in FIG. 17. Moreover, the counter electrode 426 is rotated in an arrow C direction in FIG. 16.

Figure 16:
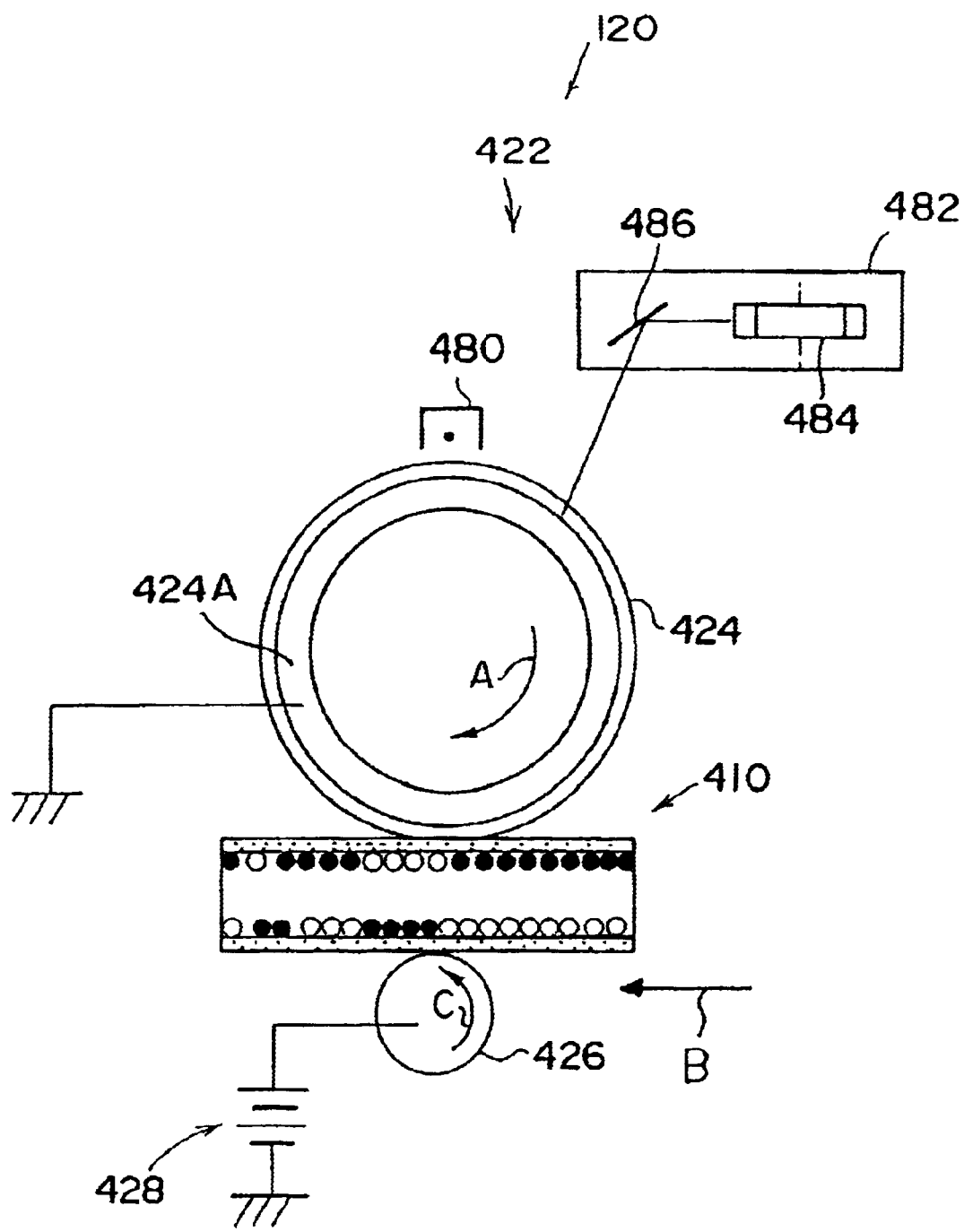
FIG. 16 is a diagram showing a fourth modified embodiment of the display element.
Figure 17:
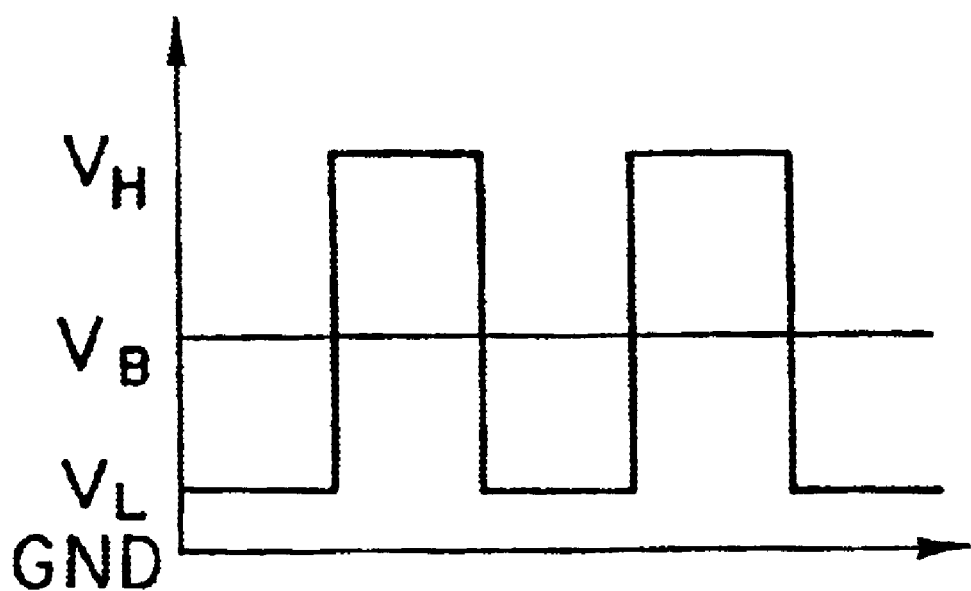
FIG. 17 is a diagram showing a bias voltage of the fourth modified embodiment of the display element.

When rotation of the electrostatic latent image supporting member 424 in the arrow A direction in FIG. 16 is started, an electrostatic latent image is formed on the electrostatic latent image supporting member 424 by the electrostatic latent image forming part 422.

In contrast, the image display medium 410 is conveyed in the arrow B direction by an un-illustrated conveyance component so as to be conveyed between the electrostatic latent image supporting member 424 and the counter electrode 426.

Here, the bias voltage $V_B$ as shown in FIG. 17 is applied on the counter electrode 426, and the potential of the electrostatic latent image supporting member 424 at a position facing the counter electrode 426 is $V_H$. Therefore, when the part of the electrostatic latent image supporting member 424 facing the display substrate is positive-charged (non-image portion) and the black particles 14 are adhered on a part of the display substrate at a part facing the electrostatic latent image supporting member 424, the positive-charged black particles 14 are moved from the display substrate side to the rear substrate and adhered thereto. Thereby, since only the white insulating particles 13 appear on the display substrate side, the image is not displayed in a part corresponding to the non-image portion.

In contrast, when the part of the electrostatic latent image supporting member 424 facing the display substrate is not positive-charged (image portion) and the black particles 14 are adhered to part of the non-display substrate (rear substrate) facing the counter electrode 426, since the potential of the electrostatic latent image supporting member 424 at a position facing the counter electrode 426 is $V_L$, the charged black particles 14 are moved from the rear substrate to the display substrate and adhered thereto. Thereby, since only the black particles 14 appear on the display substrate, the image is displayed in a part thereof corresponding to the image portion.

Accordingly, the black particles 14 are moved according to the image so as to display the image on the display substrate side. Even after the electric field generated between the substrates of the display medium 410 disappears, the displayed image can be maintained by the adhesion force inherent to the particles and the image force between the particles and the substrates. Moreover, since the black particles 14 and the white particles 13 can be moved again when an electric field is generated between the substrates, images can be displayed repeatedly by the display element 120.

Moreover, since the bias voltage is applied to the counter electrode 426, the black particles 14 can be moved whether they adhered to the display substrate or the rear substrate. Therefore, it is not necessary to preliminarily adhere the black particles 14 to one of the substrates. An image with high contrast and high sharpness can be formed. Since the charged particles are moved by the electric field with the air as the medium, it is highly safe. Since the air has a low viscous resistance, the high speed response property can be satisfied.

Figure 3A:
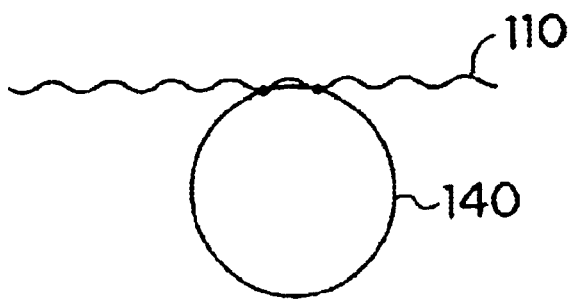
FIGS. 3A to 3D are diagrams showing contacting surfaces of a substrate and particles according to a first embodiment.

The display element and the modified embodiments of the display element have been explained so far. In this embodiment, for example, the simple matrix-type display element 120 is used as shown in FIG. 9. As shown in FIG. 3A, the surface 110 of the display substrate and the rear substrate face each other, that is, the dielectric film 10c or 11C is roughened to a predetermined surface roughness, for example, 1 nm or more and 10 μm or less. The surface roughness denotes the center line average roughness defined in the JIS B-0601 as an index showing the characteristics of the substrate surface shape.

Figure 3B:
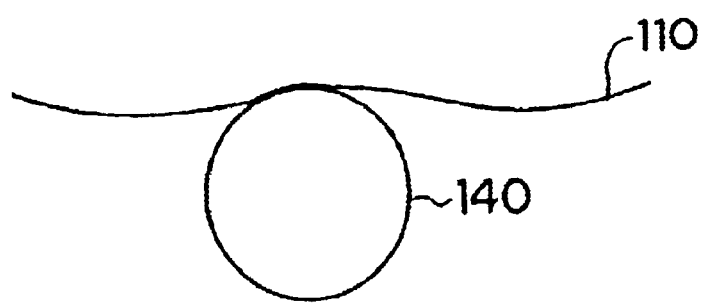
Figure 3C:
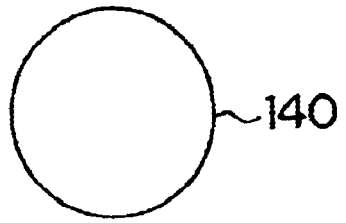

As the particles, a spherical one as shown in FIG. 3C is used. For example, it is preferable to use one having the coefficient of shape of more than 100 and no greater than 140. The coefficient of shape FE is the index showing the characteristics of the shape of the particles, which are defined by an equation (1), that is, the roundness. A coefficient of shape closer to 100 indicates that the shape of the particle is close to the sphere. L represents the circumference of the particle when the particle projected onto a plane, and S represents on area when the particle projected onto a plane.

$$FE=((L^2/S)/4\pi)\times 100 \quad (1)$$

The particles 140 adhered on the surfaces 110 of the display substrate 10 and the rear substrate 11, which surfaces face each other, are held to the substrates by the image force between the substrates and the particles or by an adhesion force, such as the van der Waals force. When the electrostatic force between the substrates exceeds the adhesion force, the particles are separated from the substrates to which they were adhered and they start moving toward the substrate facing the adhered substrate.

The adhesion force increases or decreases in relation to the distance between the substrate surfaces and the particle surfaces and the contact area. When the substrate surface is smooth, the substrate surfaces and the particle surfaces are closely contacted so as to raise the adhesion force. As shown in FIG. 3A, when the substrate surface is roughened, a space is formed between the substrate surfaces and the particle surfaces so that the distance between the substrate surfaces and the particle surfaces is increased. Moreover, since the contact between the substrate surfaces and the particle surfaces is changed from the surface contact to the point contact, the contact area between the particle surfaces and the substrate surfaces is reduced. Therefore, the adhesion force between the substrates and the particles is reduced so that the moving starting voltage for liberating the particles from the adhered substrates and starting the movement can be reduced. That is, the driving voltage of the display element 120 can be reduced.

However, when the surface roughness Ra is larger than, for example, 10 μm or larger, as shown in FIG. 3B, the particles and the substrate surfaces are surface-contacted due to an enlargement of the waviness of the substrate surfaces with respect to the particles so that the adhesion force is increased and the moving starting voltage of the particles is increased. Moreover, when the surface roughness Ra is 1 nm or less, the distance between the substrates and the particles is approached so that the short distance adhesion force is drastically increased. Therefore, in order to reduce the driving voltage of the display element by reducing the adhesion force, as the average surface roughness Ra, the surface roughness Ra of the substrate surfaces to be contacted with the particles is preferably 1 nm<Ra≦10 μm.

Figure 3D:
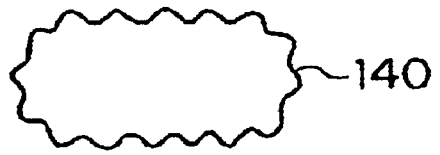

In order to reduce the distance and the contact area between the substrate surfaces and the particle surfaces, it is preferable that the particles are substantially spherical and they have little ruggedness. When the value of the coefficient of shape exceeds 140, as shown in FIG. 3D, the ruggedness of the particle surfaces is significant so as to comprise a non-spherical shape. When the particles having thus shape collide and rub against each other due to a high speed particle movement between the electrodes, breaking off parts of the particles are generated and the broken off parts adhere to the electrodes so that the display contrast is lowered. In contrast, when the value of the coefficient of the surface shape FE of the particles is close to 100, as shown in FIG. 3C, the particle surfaces are substantially spherical with little ruggedness so that a partial lack is hardly generated by the particle movement between the electrodes, and thus the distance and the contact area between the substrate surfaces and the particle surfaces can be reduced. Thereby, the driving voltage of the display element 120 can be reduced. Specifically, it is preferable that particles having the coefficient of shape of 100 or more and 140 or less are used.

EXAMPLES

In these example, as the substrates for the display substrate and the rear substrate, a 7059 glass substrate having a transparent ITO and a length×width×thickness=50 mm×50 mm×1.1 mm size was used. On the surface of the display substrate, an electrode of an ITO was formed, the electrode being connected to the voltage control part. Moreover, on the surface of the electrode, a dielectric film of a 10 μm film thickness was provided by soaking application of a solution prepared by dissolving 10 parts by weight of a polycarbonate resin (Eupiron Z, produced by Mitsubishi Gas Chemical Company, Inc.) in 90 parts by weight of a toluene and drying at 120° C. for 30 minutes. Similarly, on the rear substrate, an electrode formed by an ITO and a dielectric film was formed.

The surface roughness Ra of the dielectric film was 0.0005 μm, and by applying a sand blast treatment to the surface layer as the dielectric film, substrates having the surface roughness Ra of 20 μm, 10 μm, 5 μm, and 0.5 μm were produced. Substrates having the surface roughness of 0.05 μm and 0.005 μm were produced by providing a dielectric film of a 10 μm thickness by agitating and dispersing fine particles each having the particle size of 0.1 μm and 0.01 μm for soaking application on the display substrate or the rear substrate and drying at 120° C. for 30 minutes.

A spacer was produced by cutting a 15 mm×15 mm square shape out of the central part of a 40 mm×40 mm×0.3 mm silicone rubber sheet, and forming lattice-like spaces therein. In the lattice-like spaces, white particles and black particles were sealed as the first particles and the second particles.

As the white particles, spherical white particles having a 23 μm average particle size and a 107 coefficient of shape were used. The method for producing the white particles was as follows. A dispersion A was produced by ball mill pulverization of 53 parts by weight of a cyclohexyl methacrylate, 45 parts by weight of a titanium oxide (Taipeku CR63 produced by Ishihara Sangyo Kaisha, Ltd.), 2 parts by weight of an antistatic controlling agent (COPYCHARGE PSY VP2038 produced by Clariant) and 5 parts by weight of a cyclohexane using a 10 mm diameter zirconia ball for 20 hours. A calcium carbonate dispersion B was produced by fine pulverization of 40 parts by weight of a calcium carbonate and 60 parts by weight of water by a ball mill. A mixture solution C was produced by mixing 4.3 g of a 2% aqueous solution of a cellogen, 8.5 g of a calcium carbonate dispersion and 50 g of a 20% salt water, executing a degasifying operation for 10 minutes by an ultrasonic machine and agitating with an emulsifying machine. 35 g of the dispersion A, 1 g of a divinyl benzene and 0.35 g of a polymerization initiator AIBN were mixed sufficiently and a degasifying operation was executed for 10 minutes by an ultrasonic machine. This mixture was put in the mixture solution C, an emulsifying operation was executed by an emulsifying machine. Next, with the emulsion placed in a bottle and sealed by a silicone plug, a reduced pressure degasifying operation was sufficiently executed using an injection needle, and a nitrogen gas was sealed therein. Next, reaction was carried out at 60° C. for 10 hours for producing particles. After a cooling operation, the dispersion was treated in a freezing dryer at −35° C. and 0.1 Pa for 2 days so as to eliminate the cyclohexane. The obtained fine particle powders were dispersed in an ion exchange water. The calcium carbonate was decomposed by a hydrochloric acid water, followed by filtration. Thereafter, the particles were washed with a sufficient amount of distilled water, shifted by a nylon sieve of 20 μm and 25 μm apertures for aligning the particle size, and dried.

As the black particles, those having a 23.2 μm average particle size and a 110 coefficient of shape were used. The method for producing the black particles was the same as the method for producing the white particles except that ball mill pulverization was carried out for 20 hours using 87 parts by weight of a styrene monomer, 10 parts by weight of a black pigment: carbon black (CF9 produced by Mitsubishi Chemical Co., Ltd), and 5 parts by weight of a cyclohexane using a 10 mm diameter zirconia ball.

15 mg of mixed particles with the white particles and the black particles mixed by a 2 to 1 weight ratio were sealed in the display element. In this example, the white particles were negative-charged and the black particles were positive-charged.

After sealing the particles in the display element, the electrode of the display substrate and the electrode of the rear substrate were disposed in a matrix-like state with the silicone rubber sheet interposed therebetween and contacted closely. The substrates were pressured and held by a double clip so as to have the silicone rubber plate and the substrates contacted closely for providing the display element. At the time, the inter-electrode distance was 300 μm.

Results of an experiment performed using the display element produced by the above-mentioned method are shown in Table 1. Table 1 shows the reduction ratio of the driving voltage by the change of the surface roughness of the substrate surface layer and the coefficient of shape of the particles. The reduction ratio of at least 30% with respect to the driving voltage, which is conventionally considered necessary, is denoted by ○, 20 to 30% by Δ, and 10% or less by x.

When the surface roughness of the substrate was 0.5 nm and the coefficient of particle shape was 100 or 150, the reduction ratio of the driving voltage was 10% or less. When the surface roughness of the substrate was 0.5 nm and the coefficient of particle shape was 110, 120 or 140, when the coefficient of particle size was 100 or 150 and the surface roughness of the substrate was 5 nm, 50 nm, 0.5 μm, 5 μm, or 10 μm, or when the surface roughness of the substrate was 20 μm and the coefficient of particle shape of 100, 110, 120 or 140, the reduction ratio of the driving voltage was 20 to 30%. When the surface roughness of the substrate was 5 nm, 50 nm, 0.5 μm, 5 μm, or 10 μm, and the coefficient of particle shape was 110, 120, or 140, the reduction ratio of the driving voltage was 30% or more.

Thus, it was learned that a high reduction ratio of the driving voltage can be provided when the surface roughness of the substrate surface layer is 1 nm < surface roughness Ra ≦10 μm, and the coefficient of particle shape is 100 < coefficient of shape ≦140.

TABLE 1

| | Driving voltage reduction ratio | | | | | | |
|---|---|---|---|---|---|---|---|
| Coefficient of | Substrate surface roughness (Ra, μm) | | | | | | |
| particle shape | 0.0005 | 0.005 | 0.05 | 0.5 | 5 | 10 | 20 |
| 100 | x | Δ | Δ | Δ | Δ | Δ | Δ |
| 110 | Δ | ○ | ○ | ○ | ○ | ○ | Δ |
| 120 | Δ | ○ | ○ | ○ | ○ | ○ | Δ |
| 140 | Δ | ○ | ○ | ○ | ○ | ○ | Δ |
| 150 | x | Δ | Δ | Δ | Δ | Δ | x |

Examples of the method for roughening the substrate surface include mechanical methods and chemical methods. Examples of the mechanical methods include sand blasting methods, embossing methods, mold stamping methods, mold peeling methods, mold transfer methods, or the like. Moreover, examples of the chemical method include light irradiation methods, mixed solution drying methods using a solution mixture having different drying rates, and the like. Moreover, examples of the method for adjusting the surface roughness of the substrate surface include methods for applying a resin with particles such as fluorine based resin particles and polyamide resin particles mixed and dispersed.

The circumference L and the area S of the particles used at the time of finding the coefficient of particle shape can be obtained by measuring. For example, the circumference L and the area S of the particles can be measured by observing the particles with a scanning type electron microscope (SEM) and measurement of the particle microscope photograph using an image analysis device Ruzex (produced by Nireco Corporation).

As the method for controlling the particle shape, for example, methods of dissolving a polymer in a solvent, mixing a coloring agent and providing particles by dispersing in a water based medium in the presence of an inorganic dispersing agent, as disclosed in the official gazette of the JP-A No. 10-10775, can be used. Moreover, in the drying step in a particle producing method by the suspension polymerization method, for example, methods using a freeze drying method can be used. According to the suspension polymerization., particles are produced by the suspension polymerization by adding an unpolymerizable organic solvent compatible with monomers (with little or no compatibility with the solvent). In the step of taking out the produced particles for drying the same for eliminating the organic solvent, the freeze drying method is used. The temperature in the freeze drying method is $-10°$ C. to $-200°$ C., and preferably $-30°$ C. to $-180°$ C.; the pressure is 40 Pa or less, and preferably 13 Pa or less.

Another method for controlling the particle shape, for example, is a method of aggregating and integrating small particles for enlarging to a desired particle size, as disclosed in the official gazette of the JP-A No. 2000-292971. The particle shape of the particles obtained by melting and kneading pulverization, classifying methods, or the like, can also be controlled by applying the mechanical impact force (by, for example, a hybridizer (Nara Machinery Co., Ltd.), an Ongumill (Hosokawamicron Corporation), a θ composer (Tokuju Kosakusho), or the like) or by raising the temperature by heating.

Although the case of changing both the surface roughness of the substrate surface and the coefficient of particle shape has been explained in this example, the present invention is not limited thereto, and, for example, it is also acceptable to change only the coefficient of particle shape or only the surface roughness of the substrate surface.

Second Embodiment

Since the same display element 120 as that of the first embodiment shown in FIG. 9 is used in the second embodiment, a detailed explanation thereof is not provided.

In the second embodiment, a substrate is used as at least one of the display substrate 10 and the rear substrate 11. The surface of said substrate that faces the other substrate, i.e., the dielectric films 10c and 11c, has a surface coarseness (Rz) smaller than the average diameter of the particles 140. Examples of this substrate are those shown in FIGS. 4A and 4B, include those having a recessed part diameter which is either shorter or longer than the diameter of the particles 140, or having a recessed part depth which is shorter than the diameter.

Figure 4A:
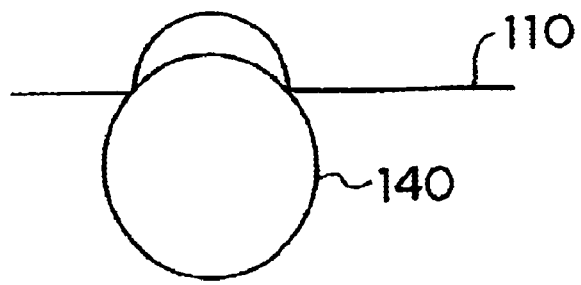
FIGS. 4A to 4C are diagrams showing a relationship between a substrate and particles according to a second embodiment.
Figure 4B:
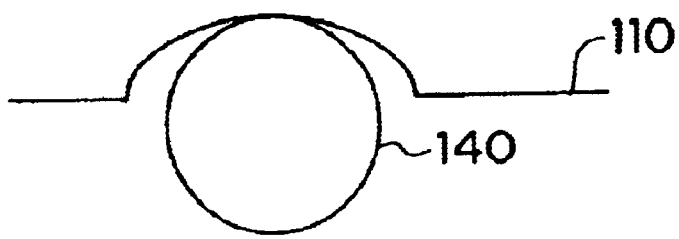
Figure 4C:
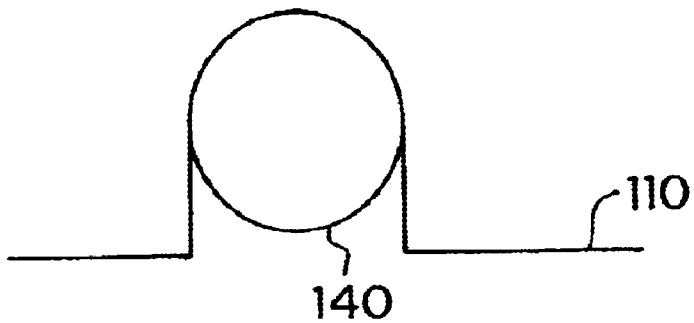
Figure 8:
FIG. 8 is a diagram showing the contacting surfaces of the substrate and the particles according to the first embodiment.

For example, as shown in FIG. 4C, when the recessed part width on the substrate surface is substantially equal to the particle diameter and the recessed part depth is the same as or larger than the particle diameter, the particles moving and fitting into the recessed part on the substrate surface becomes a problem. As shown in FIG. 8, even when the particles 140 are physically scavenged in the recessed part of the substrate surface 110, since the particles 140 can be moved between the substrates by applying a voltage between the substrates, the image can be displayed. Moreover, since the close contacting property between the substrate surfaces 110 and the particles 140 can be improved if the particles 140 are scavenged, the image holding property and the impact resistance property can be improved. However, the driving voltage necessary for moving the particles 140 scavenged in the recessed part of the substrate surfaces 110 is raised.

In contrast, when the width and the depth of the recessed part of the substrate surfaces are not identical to the diameter of the particles and the contact parts of the recessed part and the particles does not form a surface (for example, as shown in FIGS. 4A and 4B, when the width of the recessed part is shorter than or longer than the diameter of the particles, or the depth of the recessed part is shorter than the diameter), the particles cannot fit into the recessed part, and thus the adhesion between the substrate surfaces and the particles is reduced. Therefore, the particles adhered on the substrates are easily separated so that the driving voltage of the display element can be reduced.

Examples

Although a display element that was substantially the same as the display element used in the first embodiment was used in these examples, the method for producing the substrate was different. The resin layer on the surface of the substrate used in this example was formed using a solution of an ultraviolet ray hardening type acrylic resin (SH601). By stamping a mold having a predetermined continuous ruggedness on the resin layer on the substrate surface, substrates having depths and widths of the recessed part as combinations of 10 μm, 25 μm and 50 μm, were produced. Moreover, as the particles, those having a 23 μm average particle size were used.

Results of the experiment are shown in Table 2. Table 2 shows the reduction ratio of the driving voltage by the change of the depth and the width of the recessed part of the substrate surface layer. When the width of the substrate recessed part was 25 μm and the depth of the substrate recessed part was 10 μm, the driving voltage was not changed drastically. When the width of the substrate recessed part was 25 μm and the depth of the substrate recessed part was 25 μm or 50 μm, the driving voltage was significantly increased to substantially 600V. Moreover, when the width of the substrate recessed part was 10 μm or 50 μm, the driving voltage was significantly reduced regardless of the depth of the substrate recessed part. Thus, it was learned that the driving voltage can be significantly reduced when the width of the recessed part of the substrate surface 110 is shorter or longer than the diameter of the particles 140, or when the depth of the recessed part,is shorter than the diameter.

TABLE 2

Driving voltage reduction ratio

| Depth of the substrate recessed part ($\mu$m) | Width of the substrate recessed part ($\mu$m) | | |
|---|---|---|---|
| | 10 | 25 | 50 |
| 10 | ○ | Δ | ○ |
| 25 | ○ | x | ○ |
| 50 | ○ | x | ○ |

Example of the method for changing the shape of the recessed part of the substrate surface includes a mechanical method and a chemical method. Examples of the mechanical method include sand blasting methods, embossing methods, mold stamping methods, mold peeling methods, mold transfer methods, and the like. Moreover, examples of the chemical method include etching methods, light irradiation methods, mixed solution drying methods using a solution mixture having different drying rates, and the like. Moreover, examples of the method for adjusting the shape of the recessed part of the substrate surface include methods for applying a resin with particles such as fluorine based resin particles and polyamide resin particles mixed and dispersed.

Third Embodiment

Since the same display element 120 as that of the first embodiment shown in FIG. 9 is used in the third embodiment, detailed explanation of the display element is not provided.

Figure 5:
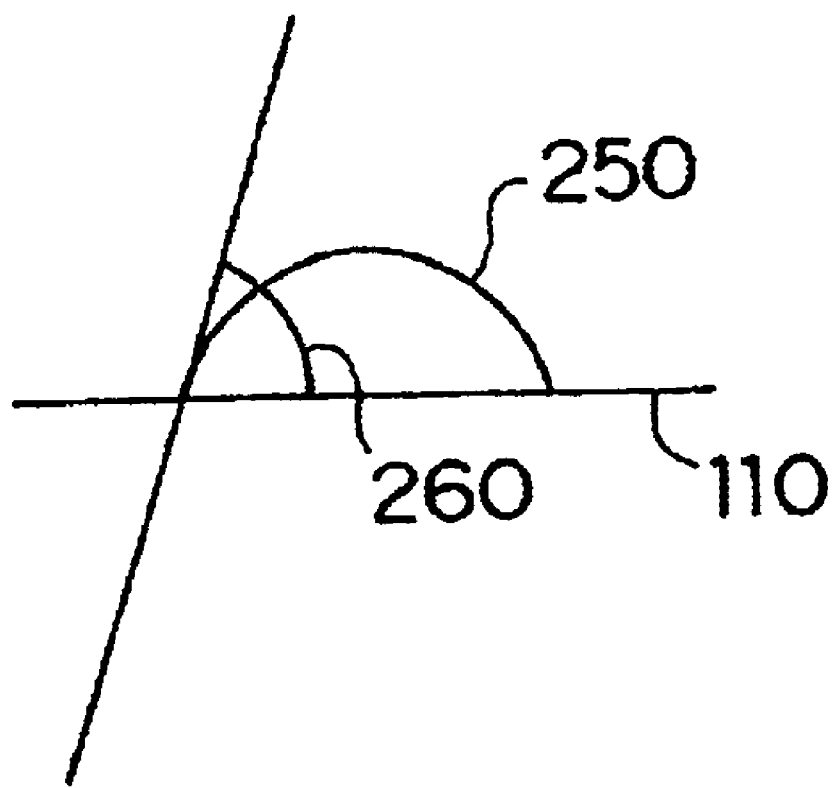
FIG. 5 is a diagram showing a contact angle according to a third embodiment.

In the third embodiment, for at least one of the display substrate 10 and the rear substrate 11, a substrate having a large water contact angle (for example, 70° or more) on the surface facing the other substrate, namely, on the dielectric films 10c and 11c is used. The water contact angle 260 of the substrate surface 110 shown in FIG. 5 is the contact angle of the water with respect to the substrate surface comprising a bulk material. When the contact angle is large, the water repelling property of the substrate is improved.

When the contact angle of the substrate surface and water is large, movement of the particles adhered on the substrate surface can be facilitated so that the image can be displayed stably at a high speed. Moreover, since the particle aggregation, or the like can be suppressed over a long time, the reliability and the life of the display element can be improved. Since the particles can easily be separated from the substrate surface and the moving starting voltage can be reduced, the driving voltage of the display element can be reduced as well. The water contact angle of the substrate surface is 70° or more, preferably 90° or more, and more preferably 100° or more.

Examples

Although a display element that substantially the same as the display element used in the first embodiment was used in those examples, the method for producing the substrate was different. The substrate having a 110° water contact angle was provided by forming the resin layer on the substrate surface by applying a solution of a fluorine resin (PTFE) by spin coating. The substrate having a 90° water contact angle was provided by forming the resin layer on the substrate surface by dipping application of a solution of a polycarbonate resin (PC-Z) with 20 parts of a fluorine resin particle (ruburon produced by Asahi Glass Company) dispersed therein. The substrate having a 75° water contact angle was provided by forming the resin layer on the substrate surface by dipping application of a solution of a copolymer nylon resin (CM8000). The substrate having a 50° water contact angle was provided by forming the resin layer on the substrate surface by dipping application of a solution of a methyl polyacrylate resin (produced by Sekisui Chemical Co., Ltd.).

Results of the experiment are shown in Table 3. Table 3 shows the reduction ratio of the driving voltage by the water contact angle of the substrate. The reduction ratio of 30% or more with respect to the driving voltage, which is conventionally regarded as necessary, is denoted by ○, 20 to 30% by Δ, and 10% or less by x. When the contact angle was 50°, the reduction ratio of the driving voltage was 10% or less. When the contact angle was 75°, 90° and 105°, the reduction ratio of the driving voltage was 30% or more. Thus, the reduction ratio of the driving voltage is large when the contact angle of the substrate surface layer is 70° or more.

TABLE 3

Driving voltage reduction ratio

| Example | Example 31 | Example 32 | Example 33 | Example 34 |
|---|---|---|---|---|
| Water Contact angle (°) | 50 | 75 | 90 | 110 |
| Driving voltage reduction ratio | x | ○ | ○ | ○ |

The substrate surface can be formed with, for example, organic compounds, inorganic compounds, metal oxides or mixtures thereof. In order to enlarge the contact angle of water and the substrate surface, for example, a fluorine based resin such as polytetrafluoroethylenes (tetrafluoroethylene: TFE), polyvinylidene fluorides, polychlorotrifluoroethylenes, PFAs, ethylene-TFE copolymers, TFE-hexafluoropropylene copolymers (FEP), ethylene-chlorotrifluoroethylene copolymers, TFE-PFA copolymers and PFA-FEP copolymers, silicone rubbers or resins such as polydimethyl siloxanes, polymethyl phenyl siloxanes, dimethyl siloxane-methyl phenyl siloxane copolymers, dimethyl siloxane-methyl vinyl siloxane copolymers and dimethyl siloxane-methyl trifluoropropyl siloxane copolymers, various kinds of resins having a fluorine group, or the like can be used. Moreover, those having fine powders such as fluorine, based fine particles (ruburon), or colloidal silicas contained in these materials, or carbon blacks, black lead or the like, with the surface treatment applied by compounds such as siloxanes, silanes and fluorines, can be used as well.

Fourth Embodiment

Since the same display element 120 as that of the first embodiment shown in FIG. 9 is used in the fourth embodiment, detailed explanation of the display element is not provided.

In the fourth embodiment, for at least one of the display substrate 10 and the rear substrate 11, a substrate having a small coefficient (for example, 0.7 or less) of dynamic friction on the surface facing the other substrate, that is, the dielectric films 10c and 11c, was used. When the coefficient of dynamic friction is small, the resistance between the substrates and the particles by forces of the dynamic friction can be reduced so as to facilitate movement of the particles, and thus the adhesion force between the substrates and the particles is reduced so that the driving voltage can be reduced. Moreover, since the load to the particles is made smaller, damage to the particle surfaces by the movement can be reduced. Thereby, display can be executed repeatedly, and even when particle movement is executed repeatedly, the display characteristics are stable.

When the coefficient of dynamic friction of the substrate surfaces exceeds 0.7, the adhesion force of the particles is increased so that the driving voltage cannot be reduced, and furthermore, loss of portions of the particles occurs. Thus, the display characteristics cannot be stable. Therefore, it is preferable that the coefficient of dynamic friction of the substrate surfaces be 0.7 or less.

Examples

Although a display element that was substantially the same as the display element used in the first embodiment was used in these examples, the method for producing the substrate was different. The substrate having a 0.1 coefficient of dynamic friction was provided by forming the resin layer on the rear substrate by dipping application of a solution of a polycarbonate resin (PC-Z) with 1,040 parts of a fluorine resin particle (ruburon produced by Asahi Glass Company) dispersed therein. The substrate having a 0.3 coefficient of dynamic friction was provided by forming the resin layer on the rear substrate by dipping application of a solution of a polycarbonate resin (PC-Z) with 1,040 parts of a polypropylene particle (Texture 5378; Shamrock chemicals) dispersed therein. The substrate having a 0.6 coefficient of dynamic friction was provided by forming the resin layer on the rear substrate by dipping application of a solution obtained by dissolving 10 parts by weight of a polyester resin (Bairon 200 produced by Toyobo Co., Ltd.) in a liquid mixture of 90 parts by weight of a toluene. The substrate having a 0.8 coefficient of dynamic friction was provided by forming the resin layer on the resin substrate by dipping application of a solution obtained by dissolving 15 parts by weight of a polystyrene resin in a liquid mixture of 85 parts by weight of a toluene.

Results of the experiment are shown in Table 4. Table 4 shows the reduction ratio of the driving voltage by the coefficient of dynamic friction of the substrate. The reduction ratio of 30% or more with respect to the driving voltage, which ratio is conventionally regarded as necessary, is shown as ○, 20 to 30% as Δ, and 10% or less as x. When the coefficient of dynamic friction is 0.8, the reduction ratio of the driving voltage was 10% or less. When the coefficient of dynamic friction was 0.6, the reduction ratio of the driving voltage was 20 to 30%. When the coefficient of dynamic friction was 0.1 or 0.3, the reduction ratio of the driving voltage was 30% or more. Thus, it was learned that the reduction ratio of the driving voltage can be large When the coefficient of dynamic friction of the substrate surface layer is 0.7 or less.

TABLE 4

Driving voltage reduction ratio by the coefficient of dynamic friction

| Example | Example 41 | Example 42 | Example 43 | Example 44 |
|---|---|---|---|---|
| Coefficient of dynamic friction | 0.1 | 0.3 | 0.6 | 0.8 |
| Adhesion force reduction degree | ○ | ○ | Δ | x |

The coefficient of dynamic friction can be found for example by measuring the coefficient of dynamic friction of the substrate surface with respect to a blade-shaped thin plate of resin. Specifically, the blade-shape thin plate of resin having a weight applied on one end part and a digital force gauge connected with the other end part was set on the substrate surface by a 45° angle. The average load at the time of pulling the thin plate was measured as the dynamic friction force. The coefficient of dynamic friction can be obtained by the calculation according to the calculation method disclosed in the JIS-K-7125-1987 using the dynamic friction force.

In order to adjust the coefficient of dynamic friction of the substrate inner surface, for example, fine particles such as fluorine based resin particles, polyamide resin particles and polyethylene resin particles can be dispersed in a matrix resin so as to be applied on the substrate surface. The present invention is not limited thereto, and for example, a surfactant and a pigment can be used as well. As the surfactant, for example, anionic surfactants, cationic surfactants, amphoteric surfactants, ester sulfate based surfactants, or the like can be used. Moreover, as the pigment, metal oxides such as silicas, titanium oxides and aluminum oxides, polyolefin resins such as polyethylenes, and resin fine particles made of acrylic resins, styrene resins, epoxy resins, or the like, such as polymethyl methacrylates can be used. Moreover, a matrix resin with a part of functional groups fluorine-modified can be applied to the substrate inner surface.

Examples of the matrix resin include polycarbonate resins, polyallylate resins, polyester resins, methacrylic resins, acrylic resins, polyamide resins, polyvinyl chloride resins, polyvinylidene chlorides, polystyrene resins, polyvinyl acetate resins, vinyl chloride-vinyl acetate copolymers, vinyl chloride-vinyl acetate-maleic anhydride copolymers, silicone resins, or the like. The film thickness of these surface layers is 1 $\mu$m to 20 $\mu$m, and preferably 2 $\mu$m to 10 $\mu$m.

These can be applied by an application method such as blade coating methods, Mayer bar coating methods, spray coating methods, soaking coating methods, bead coating methods, air knife coating methods and curtain coating methods.

Ordinary organic solvents such as aromatic hydrocarbons such as benzenes, toluenes, xylenes and chlorobenzenes, ketones, such as acetones and 2-butanones, halide aliphatic hydrocarbons, such as methylene chlorides, chloroforms and ethylene chlorides, cyclic or straight chain ethers, such as tetrahydrofurans and ethylethers, or the like, can be used alone or in mixtures of two or more as the solvent for providing the surface layer.

The surface layer can be provided integrally with the substrate material. In this case, the step of applying the surface layer can be eliminated. Moreover, when the surface layer is provided with fine particles or a surfactant mixed by a large amount, the substrate transparency can be lowered. In this case, the surface layer with the fine particles or the surfactant mixed by a large amount can be provided only in the rear substrate.

Fifth Embodiment

Since the same display element 120 as that of the first embodiment shown in FIG. 9 is used in the fifth embodiment, detailed explanation of the display element is not provided.

In the fifth embodiment comprises at least one of the surface substrate 10 and the rear substrate 11, the substrate having a large surface resistance (for example, $1.0 \times 10^7$ $\Omega/cm^2$ or more) on the surface of the side facing the other substrate is used.

Figure 6A:
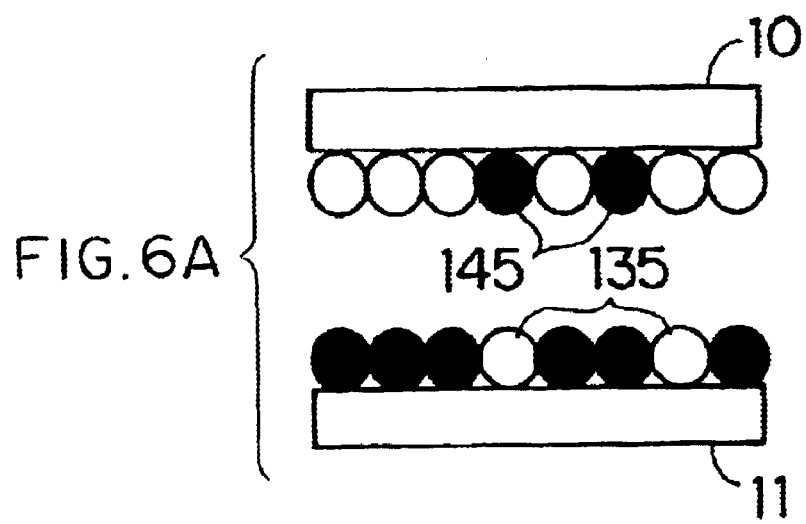
FIGS. 6A to 6C are diagrams showing states of particles according to a fifth embodiment.
Figure 6B:
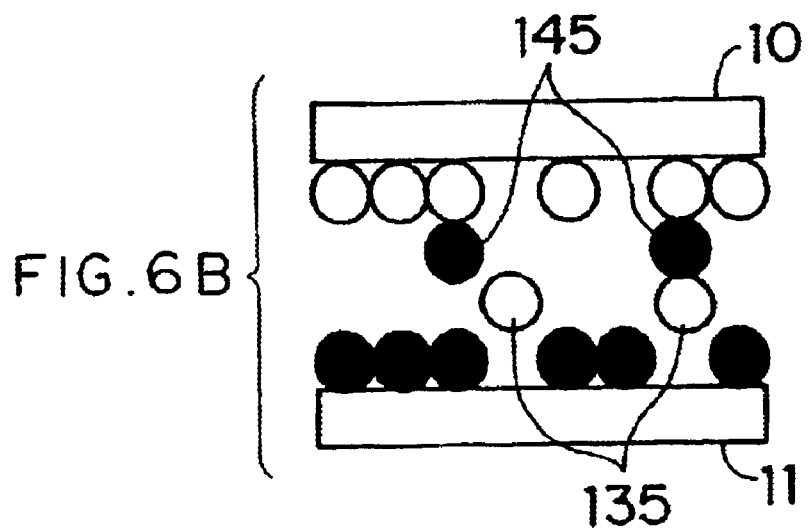

When the surface resistance of the substrate is small, the charge accumulated in the particles can easily be transferred to the substrates so that the charge amount of the particles cannot be held normally. When the charge amount of the particles is reduced to less than a predetermined value, for example, a value at which particles 135 and 145 cannot be separated from the adhered substrates by a predetermined driving voltage as shown in FIG. 6A, or particles 135 and 145 capable of being separated from the adhered substrates but incapable of moving to the facing substrate as shown in FIG. 6B can be generated. When these particles exist, an image with a low contrast and image irregularities are displayed.

Figure 6C:
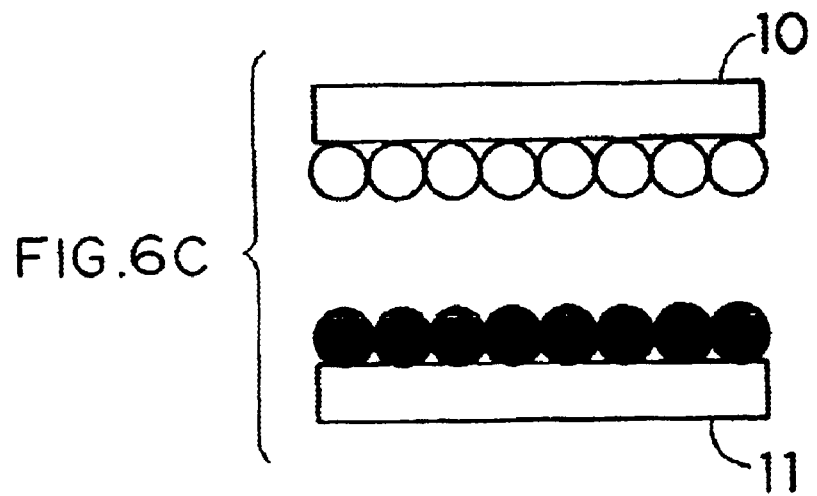

When the surface resistance of the substrate is large, since the charge amount of the particles can be maintained normally without moving the charge accumulated in the particles to the substrate, the particles moved by a predetermined driving voltage each can be adhered to a predetermined substrate, as shown in FIG. 6C, so that an image with a high contrast and without image irregularities can be displayed. Therefore, the driving voltage is reduced accordingly. The surface resistance of the substrate surface is $1.0 \times 10^7$ $\Omega/cm^2$ or more, preferably $1.0 \times 10^{10}$ $\Omega/cm^2$ or more, and more preferably $1.0 \times 10^{12}$ $\Omega/cm^2$ or more.

Examples

Although a display element that was substantially the same as the display element used in the first embodiment was used in these examples, the method for producing the substrate was different. The substrate having a $1.0 \times 10^{12}$ $\Omega/cm^2$ surface resistance was provided by forming the resin layer on the substrate surface by dipping application of a solution of a polycarbonate resin (PC-Z). The substrate having a $1.0 \times 10^8$ $\Omega/cm^2$ surface resistance was provided by forming the resin layer on the substrate surface by dipping application of a solution of a polycarbonate resin (PC-Z) having 5 parts of a conductive fine powder dispersed. The substrate having a $1.0 \times 10^6$ $\Omega/cm^2$ surface resistance was provided by forming the resin layer on the substrate surface by dipping application of a solution of a polycarbonate resin (PC-Z) with 7 parts by weight of a conductive fine powder dissolved. The substrate having a $1.0 \times 10^4$ $\Omega/cm^2$ surface resistance was provided by forming the resin layer on the substrate surface by dipping application of a polycarbonate resin (PC-Z) with 15 parts by weight of a conductive fine powder dissolved.

Results of the experiment are shown in Table 5. Table 5 shows the quality of the displayed image according to the surface resistance of the substrates. The image quality was evaluated by the change of the display density after applying a voltage between the substrates, cutting off the voltage and leaving for a long time. The change ratio with respect to the initial display density of 10% or less is denoted by ○, 20 to 30% by Δ, and 30% or more by x.

When the surface resistance was $1.0 \times 10^4$ $\Omega/cm^2$, the change ratio of the display density was 30% or more. When the surface resistance was $1.0 \times 10^6$ $\Omega/cm^2$, the change ratio of the display density was 20% to 30%.

When the surface resistance was $1.0 \times 10^8$ $\Omega/cm^2$ or $1.0 \times 10^{12}$ $\Omega/cm^2$, the change ratio of the display density was 10% or less. Thus, it was learned that a high quality image can be displayed with a high display density holding property when the surface resistance is $1.0 \times 10^7$ $\Omega/cm^2$ or more.

TABLE 5

Quality of the displayed image

| Example | Example 51 | Example 52 | Example 53 | Example 54 |
|---|---|---|---|---|
| Surface resistance of the substrate ($\Omega/cm^2$) | $10^4$ | $10^6$ | $10^8$ | $10^{12}$ |
| Quality of the displayed image | x | Δ | ○ | ○ |

Examples of the material for increasing the surface resistance of the substrate surface include resins, such as polycarbonate resins, polyallylate resins, polyester resins, methacrylic resins, acrylic resins, polyamide resins, polyvinyl chloride resins, polyvinylidene chlorides, polystyrene resins, polyvinyl acetate resins, vinyl chloride-vinyl acetate copolymers, vinyl chloride-vinyl acetate-maleic anhydride copolymers and silicone resins. Moreover, resin mixtures with foreign substance such as inorganic pigments, organic pigments, resin fine particles, conductive materials, semi-conductive materials, and various kinds of low molecular materials dispersed in these resins can be used as well.

Sixth Embodiment

Since the same display element 120 as that of the first embodiment shown in FIG. 9 is used in the sixth embodiment, detailed explanation of the display element is not provided.

In the sixth embodiment, a gas barrier layer 23 is provided on the peripheral surface of the surface substrate 10 and the rear substrate 11 as shown in FIG. 7.

The charge amount of the particles is influenced by the humidity. For example, when the humidity is low, the charge amount becomes higher, and when the humidity is high, the charge amount becomes low. The change of the charge amount according to the humidity differs depending on the kinds of particles, the combination, the mixing ratio, whether or not the external addition treatment is executed, or the like. Therefore, in order for the stable display by the display element, the optimum humidity should be maintained in accordance with the particles. Moreover, if the humidity in the inside of the substrate becomes high, the adhesion forces among the particles and between the particles and the substrate surfaces are increased by the liquid cross-linking force so that the particles cannot be moved smoothly.

In the present invention, by providing the gas barrier layer 23 in the substrates, entrance of the atmosphere, in particular, water vapor into the space can be suppressed by tightly sealing a dry gas provided between a space between the display substrate 10 and the rear substrate 11. Since the charge property of the particles sealed in the space over a long time can be stabilized by closely sealing the dry gas, the image holding property can be improved so that an image with a high contrast can be displayed repeatedly without image irregularities. Since the adhesion force does not increase the driving voltage need not be increased.

The water vapor transmission ratio measured using for example, Permatran W1A produced by MOCON, Inc., is preferably 0.2 $g/m^2/day$ to 0.0001 $g/m^2/day$, with the surface opposite to a surface having the gas barrier layer formed therein is disposed toward the humidifying side under conditions of the 40° C. and 90% RH.

Examples

Although a display element that was substantially the same as the display element used in the first embodiment was used in this example, the method for producing the substrate was different.

The substrate having a 0.04/m²/day water vapor transmission ratio was produced by forming a silicon oxide by the vacuum deposition method by a 1,000 angstrom thickness on the surface of a glass substrate, forming a film of an indium tin oxide on the substrate by the sputtering method so as to have a 100 Ω surface resistance, and dipping application of a solution of a polycarbonate resin (PC-Z) with 10 parts by weight of a fluorine resin particle (ruburon, produced by Asahi Glass Company) dispersed therein. The substrate having a 0.2 g/m²/day water vapor transmission ratio was produced by forming the silicon oxide on the surface of the outer side of the glass substrate (that is, the side opposite to the surfaces facing each other) by a 10,000 angstrom thickness by the vacuum deposition method. The substrate having a 0.004 g/m²/day water vapor transmission ratio was be produced by using a polyether sulfone film instead of the glass substrate, forming a silicon nitride by a 1,000 angstrom thickness by the vacuum deposition method on the surface of both sides of the film, and dipping application of a solution of a polycarbonate resin (PC-Z) with 10 parts by weight of an acrylic resin fine particle on the silicon nitride film on the inner side of the film (that is, the side opposite to the surfaces facing each other).

After applying a voltage between the substrates of the display elements each using one of the substrates having 0.04 g/m²/day, 0.2 g/m²/day or 0.004 g/m²/day water vapor transmission ratios, the voltage was cut off and the substrates were left in a 40° C. and 90% RH environment for 10 days. Thereafter, by applying a voltage between the substrates, all the display elements were able to display an image similarly as before the leaving operation. Thus, it was learned that the image quality of the display image can be improved by avoiding the influence of the atmosphere on the particles of the display element by providing the gas barrier layer and reducing the water vapor transmission ratio.

Although an example of the substrates having an electrode was used in this example, for example, a substrate not having an electrode shown in FIG. 12 can be used as well.

Examples of the material for the gas barrier layer, when of forming the gas barrier layer in a dry process include aluminums, aluminum oxides, silicon oxides, silicon nitrides, or the like. When of forming the gas barrier layer in a wet process, polyvinyl alcohol based polymers such as polyvinyl alcohols and polyvinyl alcohol-ethylene copolymers, polyacrilonitrile based polymers such as polyacrylonitriles and polyacrylonitrile-styrene copolymers, and coating materials such as polyvinylidene chlorides, can be used.

The gas barrier layer 23 can be provided on at least one surface of at least one of the display substrate 10 and the rear substrate 11.

Seventh Embodiment

Since the same display element 120 as that of the first embodiment shown in FIG. 9 is used in the seventh embodiment, detailed explanation of the display element is not provided.

In the seventh embodiment, particles having a predetermined electrification rank (for example, an absolute value of the average charge amount per unit weight of 0.0001 to 0.1 C/kg) are used.

The particles are charged by the friction from collisions with the substrate surface or with the other particles. Therefore, when the electrification ranks of the substrate surface and the particle are significantly different, the electrostatic adhesion force with each other becomes high so that the driving voltage necessary for liberating the particles from the substrate surface is increased.

When the average charge amount is small (for example, 0.0001 C/kg or less), even if the driving voltage is applied, there may be particles, which do not move from the adhered substrate surface. If these particles exist, the image contrast is lowered generating image irregularities. Similarly, when the average charge amount is large (for example, 0.1 C/kg or larger), since the particles become an aggregate so as to move in the same direction, the image contrast is lowered so as to display an image with image irregularities. Therefore, it is preferable that at least one of the particles has an electrification rank with the absolute value of the average charge amount per unit weight of 0.0001 to 0.1 C/kg. When the particles have the electrification rank, the particles can be moved by an electric field applied between the substrates without increasing the driving voltage so that a high-contrast image can be displayed without image irregularities.

The charge characteristics of the particles can be controlled by the material comprising the particles, the external adding agent or the internal adding agent to be added to the particles, the layer structure of the particles, the shape of the particles, the particle size of the particles, or the like.

Eighth Embodiment

The eighth embodiment uses the same display element 120 that is used in the first embodiment and shown in FIG. 9. Therefore, description of the display element 120 will be omitted.

In the eighth embodiment, at least one of the display substrate 10 and the rear substrate 11 has a surface layer on the surface facing the other substrate. This layer, namely, the dielectric film 10c or the dielectric film 11c, has a volume resistivity of from 7 to 16 (and preferably 11 to 14) as expressed by a common logarithmic value (logΩ·cm). Either of the display substrate 10 and the rear substrate 11 may have the layer comprising this predetermined volume resistivity, but from a viewpoint of improving a stability of repetition, it is preferable for the rear substrate 11 to have this layer.

As described above, the display element repeatedly displays an image by applying electricity to reverse the direction of the electric field between the substrates. At this time, repeated frictional electrification among the particles and repeated contact electrification between the particles and the two substrates causes the amount of electrification of the particles to increase little by little, and from the increase of static electricity, the coagulation among the particles and the adherence of the particles to the substrates become able to occur more easily. It is thought that this is because of a process wherein the charged particles contact the substrate, reversing the direction of the electric field, and separating from the substrate. Thus, it becomes difficult to disperse the charge of the substrate from a point of contact of the substrate with the particles to a region of the substrate surrounding the point of contact, the charge of the substrate surface increases and the amount of electrification of the particles increases little by little.

In the eighth embodiment, by giving the surface layer of the substrate the specified volume resistivity, then in the process wherein the particles are separating from the substrate, the charge of the substrate can be sufficiently separated and leaked from the surface region, the increase of the charge of the substrate surface is prevented, stabilizing the charge characteristic of the particles over a long time and suppressing coagulation of the particles becomes possible. Thus, the image having high contrast and no image-unevenness is displayed with the low driving voltage and the stable repetition. In particular, because the stability of repetition is improved when the surface layer of the substrate is given the specified volume resistivity, an excellent image can be displayed over a long period of time.

The volume resistivity of the surface layer of the substrate may be adjusted by a selection of a resin material that will form the surface layer, or by including a conducting agent. These materials will be explained hereinafter as component materials of the dielectric films 10c and 11c.

A case when the surface layer having the specified volume resistivity corresponds to the dielectric films 10c and 11c will now be explained. The surface layer having the specified volume resistivity is not particularly limited as long as it contacts the particles. When the display substrate 10 or the rear substrate 11 is formed by single layers (for example, the case when the structure of the substrates does not have an electrode), the substrate itself is sufficient. For example, the surface layer having the specified volume resistivity corresponds, for example, to the gas barrier 23 in the case of the substrate shown in FIG. 7, and to the transparent substrates 10a or 11a in the case of the substrates shown in FIGS. 11 and 12.

Examples

In these Examples, essentially the same display element as that of the Example of the first embodiment is used, but the formation method for the substrate is different.

Example 81

In Example 81, the surface layer having a thickness of 10 μm was formed as a resin layer by dissolving 10 parts by weight of polycarbonate resin (Iupilon Z by Mitsubishi Gas Chemical Company) in 90 parts by weight of toluene, dip-applying this mixture to the display substrate surface (the electrode surface), and drying at 120° C. for 30 minutes. A 30 μm thick surface layer was formed on the rear substrate surface by, after applying an insulating primer, adhering a film made by extrusion molding 15 parts of carbon black dispersed in polyester resin. The common logarithmic value of the volume resistivity for the polycarbonate resin of this display substrate was 16.5. Moreover, the common logarithmic value of the volume resistivity for the film on the back substrate, which film was formed by dispersing the carbon black, was 11.0.

Example 82

Example 82 was essentially the same as Example 81, except that in the back substrate of Example 82, 25 parts of the carbon black was used for the film, and the thickness thereof was made to be 35 μm. The common logarithmic value for the volume resistivity of the film was 7.0.

Example 83

Example 83 was essentially the same as Example 81, except that in the back substrate of Example 83, 7 parts of the carbon black was used for the film, and the thickness thereof was made to be 33 μm. The common logarithmic value for the volume resistivity of the film was 16.0.

Example 84

Example 84 was essentially the same as Example 81, except that in the back substrate of Example 84, 12 parts of the carbon black was used for the film, and the thickness thereof was made to be 34 μm. The common logarithmic value for the volume resistivity of the film was 13.0.

Example 85

Example 85 was essentially the same as Example 81, except that in the back substrate of Example 85, the film was formed in the following manner. The common logarithmic value for the volume resistivity of the film of the back substrate was 14.5.

A polyimide film was obtained by the following process. A de-doped polyimine was obtained by doping a polyaniline quinone diimine/pheenylene diamine-type polyaniline with a sulfuric acid, which was a proton acid having an acid dissociation constant of pka value 4.0 or less, to generate an aniline oxidized polymer, then, de-doping this doped polyamiline using an ammonia, which is a basic substance. This de-doped polyamiline was dissolved in an N-methyl-2pyrolidone to obtain a de-doped polyamiline solution (15% density by weight). Next, this de-doped polyamiline solution was added to a polyamic acid solution (20% density by weight)at a proportion of 100 g to 425 g, respectively, and phosphoric acid, which is a dopant, was added in the same amount as the de-doped polyamiline. Thus, a film forming solution formed from the de-doped polyamiline, the phosphoric acid, which is the dopant, and a polyimide precursor, was obtained. The film forming solution was spread evenly in a thickness of 200 μm over a stainless steel, sheet-shaped base material. After drying the film forming solution at 120° C. for 120 minutes, imidization was completed by further phased temperature increases: 150° C. for 30 minutes, 200° C. for 30 minutes, 250° C. for 60 minutes and 420° C. for 30 minutes. Thereafter, this was peeled off to obtain the polyimide film having a thickness of 40 μm, and including the 15% density by weight de-doped polyaniline.

Example 86

Example 86 is essentially the same as Example 81, except that in the display substrate of Example 86, as the resin layer (the surface layer), the film formed as explained below was adhered via the insulating primer. The common logarithmic value for the volume resistivity of the film was 12.0.

A mixed resin comprising 20 parts of a transparent conductive polymer (Chibairugasutatto P-18) and 80 parts of PETG resin, was melted and mixed using a vented twin axes extruder at 240° C., extruded, and contacted with and fastened to an outer periphery of a cooling mandrel, which was disposed lower than and along the same line as an extruded die, and cooled the extruded die at 80° C. to obtain the 30.0 μm thick film.

Example 87

Example 87 was essentially the same as Example 81, except that in the back substrate of Example 87, 30 parts of the carbon black was used for the film, and the thickness thereof was made to be 33 μm. The common logarithmic value for the volume resistivity of the film was 6.7.

Example 88

Example 88 was essentially the same as Example 81, except that in the back substrate of Example 88, the carbon black was not added to the film, and the thickness thereof was made to be 33 μm. The common logarithmic value for the volume resistivity of the film was 17.1.

Results of tests are shown in Table 6. Table 6 shows a change in the image density after repeatedly displaying 100,000 times, and the presence or absence of particle adherence before and after repeatedly displaying. The image density change of 5% or less is denoted by ⊚, 10% or less by ○, 20–30% by Δ, and 30% or more by X.

It can be seen from the results of the test that when the common logarithmic value (logΩ·cm) for the volume resistivity of the surface layer of the substrate was from 7 to 16, then even when repeating display was performed over a period of 100,000 times, density change and the particle adherence did not occur, the charge characteristics of the particles were stable, the coagulating of the particles was suppressed, and a high contrast image without image unevenness could be repeatedly and stably displayed with low driving voltage. Moreover, when the common logarithmic value (logΩ·cm) for the volume resistivity was from 11 to 14, a particularly good result was obtained.

TABLE 6

| Volume Resistivity of Substrate Surface Layer (logΩ cm) | | Particle Fixing at | Density Change After 100,000 Repeated | Particle Fixing After 100,000 Repeated |
|---|---|---|---|---|
| Display Substrate | Rear Substrate | Initial Time | Displaying Cycles | Displaying Cycles |
| Ex.81 | 16.5 | 11.0 | No | ⊚ | No |
| Ex.82 | 16.5 | 7.0 | No | ○ | No |
| Ex.83 | 16.5 | 16.0 | No | ○ | No |
| Ex.84 | 16.5 | 13.0 | No | ⊚ | No |
| Ex.85 | 16.5 | 14.5 | No | ○ | No |
| Ex.86 | 12.0 | 11.0 | No | ⊚ | No |
| Ex.87 | 16.5 | 6.7 | No | Δ | In Portions |
| Ex.88 | 16.5 | 17.1 | In Portions | x | Whole Surface |

The above Examples were all explained using substrates having the electrode. However, the substrate that does not have the electrode thereon can also be used.

Although the first to eighth embodiments have been explained individually, the display element can be obtained by combining at least two of the first to eighth embodiments. Moreover, although the first to eighth embodiments have been explained using the display element 120 shown in FIG. 9, the display elements 120 shown in FIGS. 1, 13 and 16 may be used as well.

Although the display substrate 10 and the rear substrate 11 are provided in a configuration each comprising the transparent substrate 10a, the transparent electrode 10b and the dielectric film 10c, and the substrate 11a, the electrode 11b and the dielectric film 11c from the outer side to the inner side, the present invention is not limited thereto, and for example, they can be provided in a configuration with the electrode 11b provided on the outermost side.

As the transparent substrate 10a of the display substrate 10 and the substrate 11a of the rear substrate 11, for example, glass, plastic plates, plastic films, or the like can be used. As to the shape thereof, drum shapes, sheet shapes, plate shapes, or the like can be used, but the present invention is not limited thereto.

As the transparent substrate 10b of the display substrate 10 and the electrode 11b of the rear substrate 11, for example, those provided with a thin film of a metal oxide, such as tin oxides, indium oxides and indium tin oxides (ITO) can be used as well. As the electrode 11b of the rear substrate 11, for example, those provided with a metal electrode, specifically, a thin film of metals such as aluminum, copper, titanium, nickel, chromium or stainless steel may be used as well.

To the surface of the transparent electrode 10b of the display substrate 10 and the electrode 11b of the rear substrate 11, for example, the oxidation treatment, the chemical treatment, the coloring treatment, the irregular reflection treatment such as sand setting, or the like can be applied. These treatments can be executed in a range that does not influence the image quality of the image to be displayed on the display element.

The spacer 12 can be formed by cutting, to a desired size, a sheet of, for example, ethylene-propylene rubbers (EPDM), polybutadienes, natural rubbers, polyisobutylenes, styrene butadiene rubbers (SBR), chloroprenerubbers (CR), nitrile rubbers (NBR), silicone rubbers, urethane rubbers, epichlorohydrine rubbers, styrene butadiene styrene elastomers (SBS), thermoplastic elastomers, norbornene rubbers, phlorosilicone rubbers and ethylene oxide rubbers. It may be formed also by applying, for example, an ultraviolet ray hardening type resin preliminarily to the electrode and exposing the resin using a photo mask so as to develop unnecessary parts. The spacer 12 of a desired shape may be formed by screen printing using a thermosetting type ink. The thickness of the spacer 12 is preferably 50 μm to 1,000 μm, more preferably 100 μm to 500 μm.

As the material for the dielectric film 10c of the display element 120, it is preferable to use a resin having a glass transition temperature of 60° C. or more. When the glass transition temperature is lower than 60° C., the particles can be adhered locally on the surface substrate by heat generation derived from the collisions between the particles and the surface substrate 10 during repeated display so as to generate the image quality defects. Examples of the resin having glass transition temperature of at least a 60° C. include polycarbonate resins, polyallylate resins, polyester resins, methacrylic resins, acrylic resins, polyamide resins, polyvinyl chloride resins, polyvinylidene chloride resins, polystyrene resins, polyvinyl acetate resins, vinyl chloride-vinyl acetate copolymers, vinyl chloride-vinyl acetate-maleic anhydride copolymers, silicone resins, or the like. The thickness of the dielectric film 10c is preferably 1 μm to 20 μm, more preferably 2 μm to 10 μm.

Examples of the method for applying the dielectric film 10c include blade coating methods, Mayer bar coating methods, spray coating methods, soaking coating methods, bead coating methods, air knife coating methods, curtain coating methods, and the like. Examples of the solvent to be used at the time of forming the dielectric film 10c include organic solvents such as aromatic hydrocarbons such as benzenes, toluenes, xylenes and chlorobenzenes, ketones, such as acetones and a 2-butanones, halide aliphatic hydrocarbons, such as methylene chlorides, chloroforms and ethylene chlorides, cyclic or straight chain ethers, such as tetrahydrofurans and ethylethers, and the like, and mixtures of two or more of the above.

The dielectric film 10c can be provided integrally with the transparent substrate 10a. In this case, the step for applying the dielectric film 10c can be eliminated.

In order to improve the contact angle, the dielectric film 10c may contain a fluorine atom containing resin fine particle. Example of the fluorine atom containing resin fine particle include polytetrafluoroethylenes, polychlorotrifluoroethylenes, polyvinylidene fluorides, polydichlorodifluoroethylenes, tetrafluoroethylene-perfluoroalkyl-vinyl ether copolymers, tetrafluoroethylene-hexafluoropropylene copolymers, tetrafluoroethylene-ethylene copolymers, tetrafluoroethylene-hexafluoropropylene-perfluoroalkyl vinyl ether copolymers, and mixtures of at least two of the above.

The material for the dielectric film 10c may be dissolved in a solvent so that the same can be dispersed with a fluorine atom containing resin fine particle by for example, a dispersing method such as ball mills, sand mills, attriters, dynomills, or the like. The content ratio (weight ratio) of the fluorine atom containing resin fine particle in the dielectric film 10c is usually 30% or less, and more usually 10% or less.

The dielectric film 10c can include a conducting agent in order to adjust the surface resistivity or the volume resistivity. This conducting agent is not particularly limited. Examples thereof include powdered metals, such as carbon, aluminum, and nickel; metal oxide compounds, such as titanium oxides; conductive polymer compounds, such as polymethyl methacrylates having a quaternary ammonium salt, polyvinylanilines, polyvinylpyrroles, polydiacetylenes, polyethyleneimines, polymer compounds having a boron atom, and polypyrroles. These examples may be used independently, or in combinations of two or more.

It should be noted that the same materials, methods, and the like, listed above in connection with the dielectric film 10c on the display substrate may also be applied to the dielectric film 11c on the back substrate in accordance with the object of the invention.

Examples of the first particles as the white particles include particles produced by adding and mixing fine powders of titanium oxide pigment to spherical fine particles of a titanium oxide containing cross-linked polymethyl methacrylate (MBX-white produced by Sekisui Plastics Co. Ltd.) or spherical fine particles of a cross-linked polymethyl methacrylate (Chemi Snow MX produced by Soken Chemical & Engineering co., Ltd.), particles produced by introducing white pigment fine powders to these spherical fine particles and fixing the fine powders on the fine particle surface by the impact force, particles produced by adhering or embedding white pigment fine powders to the surface of fine particles of styrene resins, phenol resins, silicone resins, glass, or the like, can be used. In particular, since the spherical fine particles of the cross-linked polymethyl methacrylate have the particles aligned by the single dispersion, they have an even charge property in each particle so that the threshold value of the particle movement with respect to the electric field is sharp. Thus, a high contrast display can be obtained. Titanium oxides, magnesium oxides, zinc oxides or the like can be used as the white pigment as well.

Examples of the fine powders to be mixed with the first particles include hydrophobic silicas and hydrophobic titanium oxides. These can be produced by modification by reacting silicas (silicon oxide) or titanium oxides with silane compounds, silane coupling agents or silicone oils and drying, so as to adjust the positive or negative charging property, the flowability, the environment dependency, or the like. In particular, titanium compounds obtained by the reaction of a $TiO(OH)_2$ and silane compounds such as silane coupling agent as disclosed in the official gazette of the JP-A No. 10-3177 are suitable. Since the titanium compound can be produced in a wet step without the need of a baking step at a high temperature (several hundred degree), strong bonds do not form between the titanium so the aggregation does not form at all, and thus the state of the primary particles can substantially be maintained. Furthermore, since the titanium compound is produced by directly reacting the $TiO(OH)_2$ with silane compounds or silicone oils, the silane compound can be processed in large amounts, and thus the charge can be controlled depending on the silane compound processing amount and the charge amount to be added is dramatically improved compared with the conventional titanium oxide.

Any of chloro silanes, alkoxy silanes, silazanes and special silyllation agents can be used as the silane compound. Moreover, examples of the silicone oil include dimethyl silicone oils, alkyl modified silicone oils, α-methyl sulfone modified silicone oils, chlorophenyl silicone oils, fluorine modified silicone oils, amino modified silicone oils, and the like.

Examples of the second particles as the black particles include spherical fine particles of cross-linked polymethyl methacrylates (MBX-black produced by Sekisui Plastics Co., Ltd.), true spherical particles of cross-linked copolymers containing divinyl benzene as a main component (Micro Pearl BB, Micro Pearl BBP produced by Sekisui Chemical Co., Ltd.), fine particles of amorphous carbons produced by baking phenol resin particles (Unibex GCP produced by Unitika Ltd.), and spherical fine particles of carbon and graphite (Nika Beads ICB, Nika Beads MC. Nika Beads PC produced by Nippon Carbon Co., Ltd.).

Although white particles and black particles have been presented as the first and second particles, the present invention is not limited thereto, and for example, colored particles of red, blue, green, magenta, cyan, yellow, gold, silver, or the like can be used as well. Examples of the red particles include spherical fine particles of cross-linked polymethyl methacrylates (MBX-red produced by Sekisui Plastics Co., Ltd.). Examples of the gold particles include true spherical conductive particles produced by electroless nickel plating on the surface of fine particles of a cross-linked copolymer containing a divinyl benzene as a main component, and applying a gold substitution plating (Micro Pearl AU produced by Sekisui Chemical Co., Ltd.), or the like.

Examples of the first and second particles include porous spongy particles that contain air, hollow particles, toners used for a copier or a printer, for example, spherical particles produced by a wet method such as the polymerization method and the suspension method, and the like.

As long as the particles have a movement threshold value with respect to the electric field, they can be driven, and thus the color of the particles, the charge property, the charge amount, or the like is not limited.

According to the present invention, in a display element for displaying an image by movement between a first substrate and a second substrate of multiple kinds of particles which have colors and charge polarities different from each other by an electric field applied between the first and second substrates, the surface roughness of at least one of the first substrate and the second substrate is more than 1 nm and 10 μm or less, the coefficient of shape is more than 100 and 140 or less, the width and depth of the recessed part is not identical to the diameter of the particles and well as the contacting surfaces of the recessed part and the particles do not for a surface, the water contact angle is 70° or more, the coefficient of dynamic friction is 0.7 or less, the surface resistance is $1.0 \times 10^7$ $\Omega/cm^2$ or more, or the gas barrier layer is provided for at least one of the first substrate and the second substrate, or the common logarithmic value (logΩ·cm) for the volume resistivity of the surface layer of the substrate was from 7 to 16. Thus, the display element according to the present invention can be driven by a low voltage as well as an image with an improved image holding property and a high contrast can be displayed with little density irregularity.

What is claimed is:

1. A display element comprising:
   a first substrate and a second substrate, which are disposed facing each other; and multiple kinds of particles having different colors and charge polarities, which particles are sealed in a space between the first substrate and the second substrate and can be moved between the first substrate and the second substrate by an electric field applied thereto, wherein the surface coarseness of at least one of the first substrate and the second substrate, on the surface thereof that faces the other substrate, is more than 1 nm and no greater than 10 μm, and the coefficient of a shape of the particles is more than 100 and no greater than 140 when FE represents the coefficient of shape of the particles, L represents the circumference of the particles, S represents the area of the particles and $FE=((L^2/S)/4\pi) \times 100$.

2. The display element of claim 1, wherein the first substrate comprises a stripe-shaped first electrode, the second substrate comprises a stripe-shaped second electrode, with the first electrode and the second electrode provided in a simple matrix shape disposed orthogonal to each other such that the electric field applied between the first substrate and the second substrate is controlled by a voltage applied to each of the first electrode and the second electrode to move the particles and form an image.

3. The display element of claim 1, comprising a printing electrode for scanning on the first substrate, wherein the electric field applied between the first substrate and the second substrate is controlled by the voltage applied to the printing electrode to move the particles and form an image.

4. The display element of claim 1, comprising a rotating, drum-shaped electrostatic latent image supporting member, which is in contact with the first substrate and an electrostatic latent image forming part for forming a latent image on the electrostatic latent image supporting member, wherein the electric field applied between the first substrate and the second substrate is controlled by the latent image formed on the electrostatic latent image supporting member to move the particles and form an image.

5. A display element comprising:
a first substrate and a second substrate disposed facing each other; and
multiple kinds of substantially spherical particles having different colors and charge polarities, which particles are sealed in a space between the first substrate and the second substrate, and can be moved between the first substrate and the second substrate by an electric field applied thereto,
wherein a surface coarseness (Rz) of at least one of the first substrate and the second substrate is smaller than the average diameters of the multiple kinds of particles.

6. The display element of claim 5, wherein the first substrate comprises a stripe-shaped first electrode, the second substrate comprises a stripe-shaped second electrode, with the first electrode and the second electrode provided in a simple matrix shape disposed orthogonal to each other such that the electric field applied between the first substrate and the second substrate is controlled by a voltage applied to each of the first electrode and the second electrode to thereby move the particles and form an image.

7. The display element of claim 5, comprising a printing electrode for scanning on the first substrate, wherein the electric field applied between the first substrate and the second substrate is controlled by the voltage applied to the printing electrode to move the particles and form an image.

8. The display element of claim 5, comprising a rotating, drum-shaped electrostatic latent image supporting member, which is in contact with the first substrate and an electrostatic latent image forming part for forming the latent image on the electrostatic latent image supporting member, wherein the electric field applied between the first substrate and the second substrate is controlled by a latent image formed on the electrostatic latent image supporting member to move the particles and form an image.

9. A display element comprising:
a first substrate and a second substrate disposed facing each other; and
multiple kinds of particles having different colors and charge polarities, which particles are sealed in a space between the first substrate and the second substrate and can be moved between the first substrate and the second substrate by an electric field applied thereto,
wherein the water contact angle of at least one of the first substrate and the second substrate, on the surface thereof that faces the other substrate, is at least 50°.

10. The display element of claim 9, wherein the first substrate comprises a stripe-shaped first electrode, the second substrate comprises a stripe-shaped second electrode, with the first electrode and the second electrode provided in a simple matrix shape disposed orthogonal to each other such that the electric field applied between the first substrate and the second substrate is controlled by a voltage applied to each of the first electrode and the second electrode for moving the particles to form an image.

11. The display element of claim 9, comprising a printing electrode for scanning on the first substrate, wherein the electric field applied between the first substrate and the second substrate is controlled by the voltage applied to the printing electrode to thereby move the particles and form an image.

12. The display element of claim 9, comprising a rotating, drum-shaped electrostatic latent image supporting member, which is in contact with the first substrate, and an electrostatic latent image forming part for forming the latent image on the electrostatic latent image supporting member, wherein the electric field applied between the first substrate and the second substrate is controlled by a latent image formed on the electrostatic latent image supporting member to move the particles and form an image.

13. A display element comprising:
a first substrate and a second substrate disposed facing each other; and
multiple kinds of particles having different colors and charge polarities, which particles are sealed in a space between the first substrate and the second substrate and can be moved between the first substrate and the second substrate by an electric field applied thereto,
wherein the water contact angle of at least one of the first substrate and the second substrate, on the surface thereof that faces the other substrate, is at least 70°.

14. The display element of claim 13, wherein the first substrate comprises a stripe-shaped first electrode, the second substrate comprises a stripe-shaped second electrode, with the first electrode and the second electrode provided in a simple matrix shape disposed orthogonal to each other such that the electric field applied between the first substrate and the second substrate is controlled by a voltage applied to each of the first electrode and the second electrode for moving the particles to form an image.

15. The display element of claim 13, comprising a printing electrode for scanning on the first substrate, wherein the electric field applied between the first substrate and the second substrate is controlled by the voltage applied to the printing electrode to thereby move the particles and form an image.

16. The display element of claim 13, comprising a rotating, drum-shaped electrostatic latent image supporting member, which is in contact with the first substrate, and an electrostatic latent image forming part for forming the latent image on the electrostatic latent image supporting member, wherein the electric field applied between the first substrate and the second substrate is controlled by a latent image formed on the electrostatic latent image supporting member to move the particles and form an image.

17. A display element comprising:
a first substrate and a second substrates disposed facing each other; and
multiple kinds of particles having different colors and charge polarities, which particles are sealed in a space between the first substrate and the second substrate, and can be moved between the first substrate and the second substrate by an electric field applied thereto,
wherein the coefficient of dynamic friction of at least one of the first substrate and the second substrate, on the surface thereof that faces the other substrate is no more than 0.6.

18. The display element of claim 17, wherein the first substrate comprises a stripe-shaped first electrode, the second substrate comprises a stripe-shaped second electrode, with the first electrode and the second electrode provided in a simple matrix shape disposed orthogonal to each other such that the electric field applied between the first substrate and the second substrate is controlled by a voltage applied to the first electrode and the second electrode to move the particles and form an image.

19. The display element of claim 17, comprising a printing electrode for scanning on the first substrate, wherein the electric field applied between the first substrate and the second substrate is controlled by the voltage applied to the printing electrode to move the particles and form an image.

20. The display element of claim 17, comprising a rotating, drum-shaped electrostatic latent image supporting member, which is in contact with the first substrate, and an electrostatic latent image forming part for forming a latent image on the electrostatic latent image supporting member, wherein the electric field applied between the first substrate and the second substrate is controlled by the latent image formed on the electrostatic latent image supporting member to move the particles and forming an image.

21. A display element comprising:
a first substrate and a second substrate disposed facing each other; and
multiple kinds of particles having different colors and charge polarities, which particles are sealed in a space between the first substrate and the second substrate and can be moved between the first substrate and the second substrate by an electric field applied thereto,
wherein the surface resistance of at least one of the first substrate and the second substrate, on the surface thereof that faces the other substrate, is at least $1.0 \times 10^6$ $\Omega/cm^2$.

22. The display element of claim 21, wherein the first substrate comprises a stripe-shaped first electrode, the second substrate comprises a stripe-shaped second electrode, with the first electrode and the second electrode provided in a simple matrix shape disposed orthogonal to each other such that the electric field applied between the first substrate and the second substrate is controlled by a voltage applied to the first electrode and the second electrode for moving the particles to form an image.

23. The display element of claim 21, comprising a printing electrode for scanning on the first substrate, wherein the electric field applied between the first substrate and the second substrate is controlled by the voltage applied to the printing electrode to thereby move the particles and form an image.

24. The display element of claim 21, comprising a rotating, drum-shaped electrostatic latent image supporting member, which is contact with the first substrate and an electrostatic latent image forming part for forming a latent image on the electrostatic latent image supporting member, wherein the electric field applied between the first substrate and the second substrate is controlled by a latent image formed on the electrostatic latent image supporting member to move the particles and form an image.

25. A display element comprising:
a first substrate and a second substrate disposed facing each other; and
multiple kinds of particles having different colors and charge polarities, which particles are sealed in a space between the first substrate and the second substrate and can be moved between the first substrate and the second substrate by an electric field applied thereto,
wherein a gas barrier layer is provided on at least one of the first substrate and the second substrate.

26. The display element of claim 25, wherein the first substrate comprises a stripe-shaped first electrode, the second substrate comprises a stripe-shaped second electrode, with the first electrode and the second electrode provided in a simple matrix shape disposed orthogonal to each other such that the electric field applied between the first substrate and the second substrate is controlled by a voltage applied to the first electrode and the second electrode to move the particles and form an image.

27. The display element of claim 25, comprising a printing electrode for scanning on the first substrate, wherein the electric field applied between the first substrate and the second substrate is controlled by the voltage applied to the printing electrode to move the particles and form an image.

28. The display element of claim 25, comprising a rotating, drum-shaped electrostatic latent image supporting member, which is in contact with the first substrate and an electrostatic latent image forming part for forming a latent image on the electrostatic latent image supporting member, wherein the electric field applied between the first substrate and the second substrate is controlled by the latent image formed on the electrostatic latent image supporting member to move the particles and form an image.

29. A display element comprising:
a first substrate and a second substrate disposed facing each other; and
multiple kinds of particles having different colors and charge polarities, which particles are sealed in a space between the first substrate and the second substrate and can be moved between the first substrate and the second substrate by an electric field applied thereto, wherein
a surface layer, which has a volume resistivity value as expressed by a common logarithmic value (log$\Omega$·cm) of 7 to 16, is disposed on a surface of at least one of the first substrate and the second substrate, which surface faces the other substrate.

30. The display element of claim 29, wherein the first substrate comprises a stripe-shaped first electrode, the second substrate comprises a stripe-shaped second electrode, with the first electrode and the second electrode provided in a simple matrix shape disposed orthogonal to each other such that the electric field applied between the first substrate and the second substrate is controlled by a voltage applied to the first electrode and the second electrode to move the particles and form an image.

31. The display element of claim 29, comprising a printing electrode for scanning on the first substrate, wherein the electric field applied between the first substrate and the second substrate is controlled by the voltage applied to the printing electrode to move the particles and form an image.

32. The display element of claim 29, comprising a rotating, drum-shaped electrostatic latent image supporting member, which is in contact with the first substrate and an electrostatic latent image forming part for forming a latent image on the electrostatic latent image supporting member, wherein the electric field applied between the first substrate and the second substrate is controlled by the latent image formed on the electrostatic latent image supporting member to move the particles and form an image.

* * * * *